US012480189B2

(12) United States Patent
Chen et al.

(10) Patent No.: US 12,480,189 B2
(45) Date of Patent: Nov. 25, 2025

(54) ALLOYS, MAGNETIC MATERIALS, BONDED MAGNETS AND METHODS FOR PRODUCING THE SAME

(71) Applicant: Neo Performance Materials (Singapore) Pte. Ltd., Singapore (SG)

(72) Inventors: Zhongmin Chen, Singapore (SG); Tao Yun, Singapore (SG); Feng Jiang, Singapore (SG); Suangcheng Wang, Singapore (SG); Jim Herchenroeder, Singapore (SG)

(73) Assignee: Neo Performance Materials (Singapore) Pte. Ltd., Singapore (SG)

( * ) Notice: Subject to any disclaimer, the term of this patent is extended or adjusted under 35 U.S.C. 154(b) by 87 days.

(21) Appl. No.: 17/048,523

(22) PCT Filed: Jul. 27, 2018

(86) PCT No.: PCT/SG2018/050377

§ 371 (c)(1),
(2) Date: Oct. 16, 2020

(87) PCT Pub. No.: WO2020/022955

PCT Pub. Date: Jan. 30, 2020

(65) Prior Publication Data

US 2021/0062310 A1 Mar. 4, 2021

(51) Int. Cl.
*C22C 38/00* (2006.01)
*C22C 38/10* (2006.01)
(Continued)

(52) U.S. Cl.
CPC ............ *C22C 38/32* (2013.01); *C22C 38/005* (2013.01); *C22C 38/10* (2013.01); *C22C 38/12* (2013.01);
(Continued)

(58) Field of Classification Search
None
See application file for complete search history.

(56) References Cited

U.S. PATENT DOCUMENTS

2012/0021221 A1* 1/2012 Miyoshi ................ C22C 38/005 419/33

FOREIGN PATENT DOCUMENTS

CN 1986856 A 6/2007
CN 103779035 A 5/2014
(Continued)

OTHER PUBLICATIONS

Machine translation of CN1986856A. (Year: 2007).*
(Continued)

*Primary Examiner* — Xiaowei Su
(74) *Attorney, Agent, or Firm* — Mintz Levin Cohn Ferris Glovsky and Popeo, P.C.

(57) ABSTRACT

The present invention relates to an alloy with composition of RE-Fe-M-B as defined herein, wherein said alloy comprises at least 80 vol % $RE_2Fe_{14}B$ phase, the average crystal grain size of the $RE_2Fe_{14}B$ phase is in the range of about 20 nm to about 40 nm, and the alloy is an alloy ribbon having a width measured from a left edge to a center portion to a right edge, and the average crystal $RE_2Fe_{14}B$ grain size difference between the center portion, and left and right edges of said alloy ribbon is less than 20%. The present invention also relates to a method for preparing an alloy ribbon with composition of RE-Fe-M-B as defined herein comprising the steps of: (i) ejecting a melt of the alloy with composition of RE-Fe-M-B onto a rotating wheel at a mass flow rate of about 0.2 kg/min to about 1.0 kg/min; and (ii) quenching the melt using the rotating wheel to obtain said alloy ribbon

19 Claims, 10 Drawing Sheets

(51) Int. Cl.

| | |
|---|---|
| ***C22C 38/12*** | (2006.01) |
| ***C22C 38/14*** | (2006.01) |
| ***C22C 38/32*** | (2006.01) |
| ***H01F 1/057*** | (2006.01) |

(52) U.S. Cl.

CPC .......... *C22C 38/14* (2013.01); *H01F 1/0578* (2013.01); *C22C 2202/02* (2013.01)

(56) References Cited

FOREIGN PATENT DOCUMENTS

| | | | |
|---|---|---|---|
| JP | S61-73861 | A | 4/1986 |
| JP | H9-316565 | A | 12/1997 |
| JP | 2003-183785 | A | 7/2003 |
| JP | 2003-328014 | A | 11/2003 |
| JP | 2006-245534 | A | 9/2006 |
| KR | 10-2003-0067722 | A | 8/2003 |
| WO | WO-2018/111188 | A1 | 6/2018 |
| WO | WO-2020/022955 | A1 | 1/2020 |

OTHER PUBLICATIONS

De Franco, V. C. et al. (2008), "Effect of Ti—C and Cr Additions on Magnetic Properties of Nanocrystalline (Pr,Nd)—Fe—B Alloys." *IEEE Transactions on Magnetics,* vol. 44, No. 11, pp. 4258-4261.

International Search Report and Written Opinion issued in International Application No. PCT/SG2018/050377, mailed Oct. 24, 2018 (Oct. 24, 2018). 10 pages.

Spyra, M. et al. (2010, e-published Apr. 15, 2010), "Lean neodymium Nd—Fe—B magnets containing minor addition of titanium." *Phys. Status Solidi A,* vol. 207, No. 5, pp. 1170-1173.

Zeng, X. et al. (2009), "Magnetic properties enhancement of $Nd_2Fe_{14}B$/a-Fe nanocomposites by Ta substitution." *Physica. B,* vol. 404, No. 20, pp. 3739-3742.

* cited by examiner

[Fig. 1]
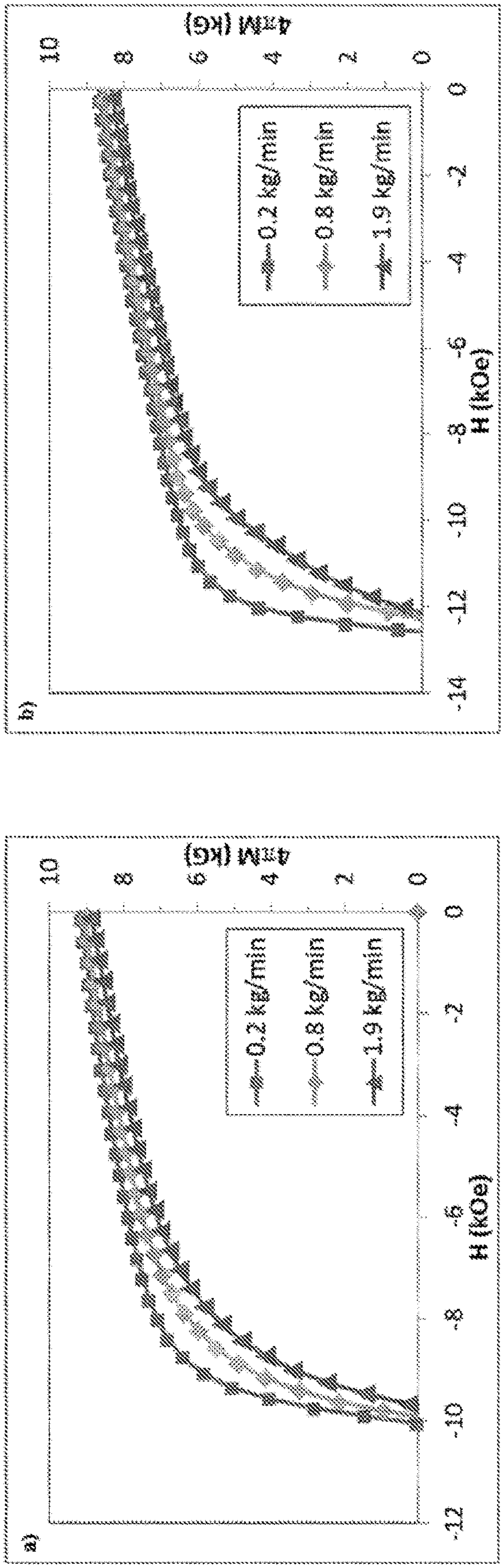

[Fig. 2]
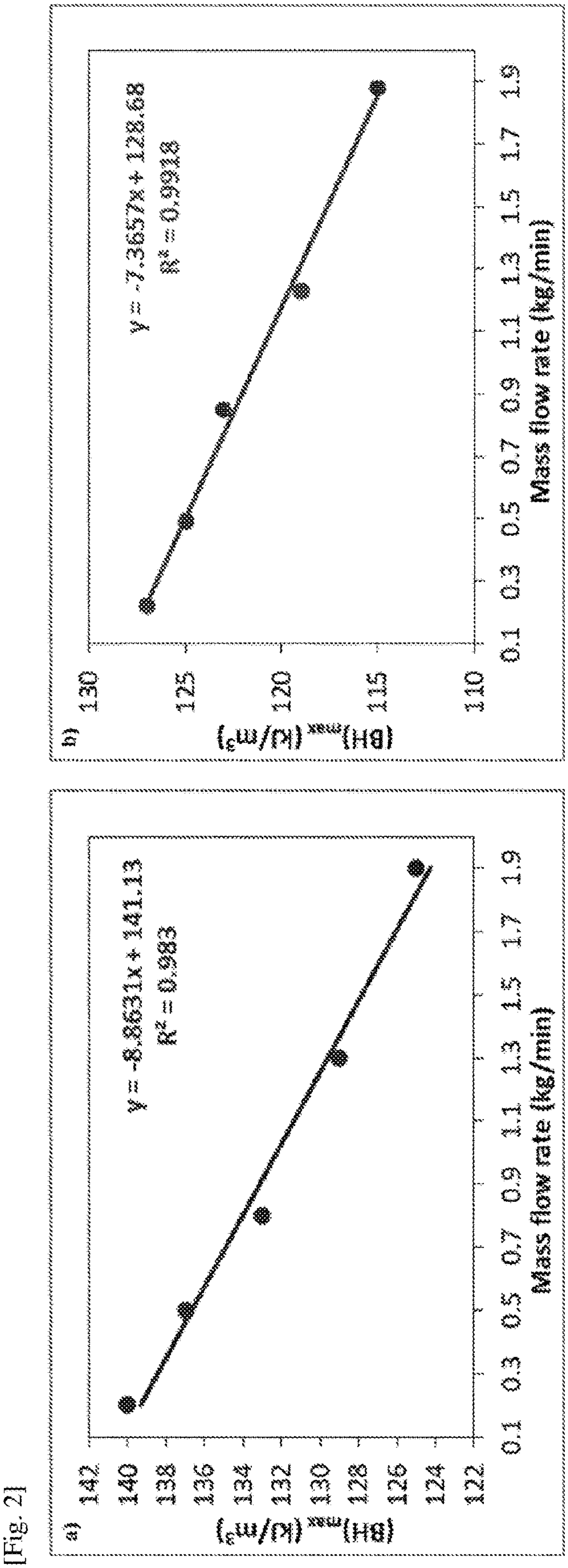

[Fig. 3]
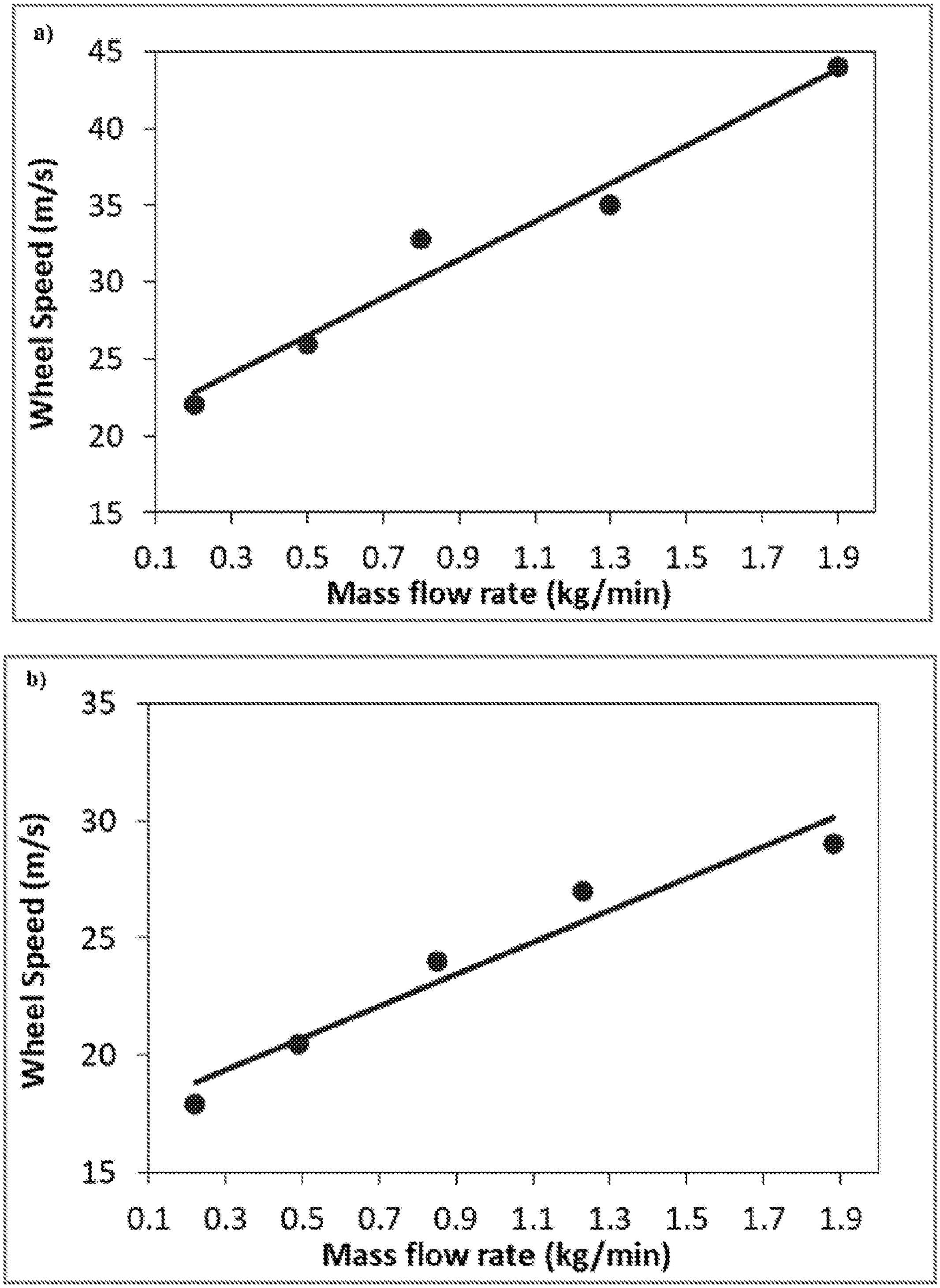

[Fig. 4]
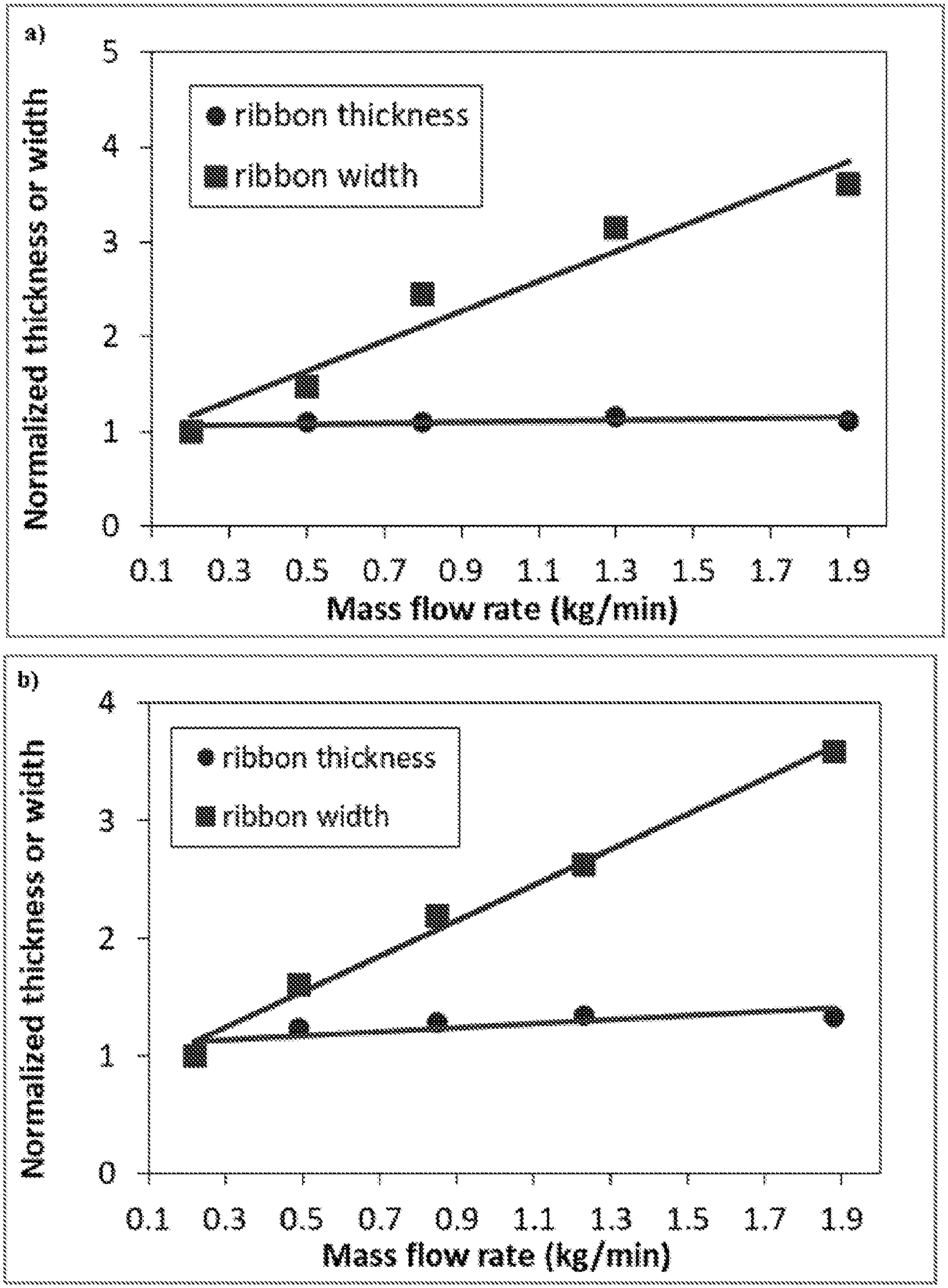

[Fig. 5]
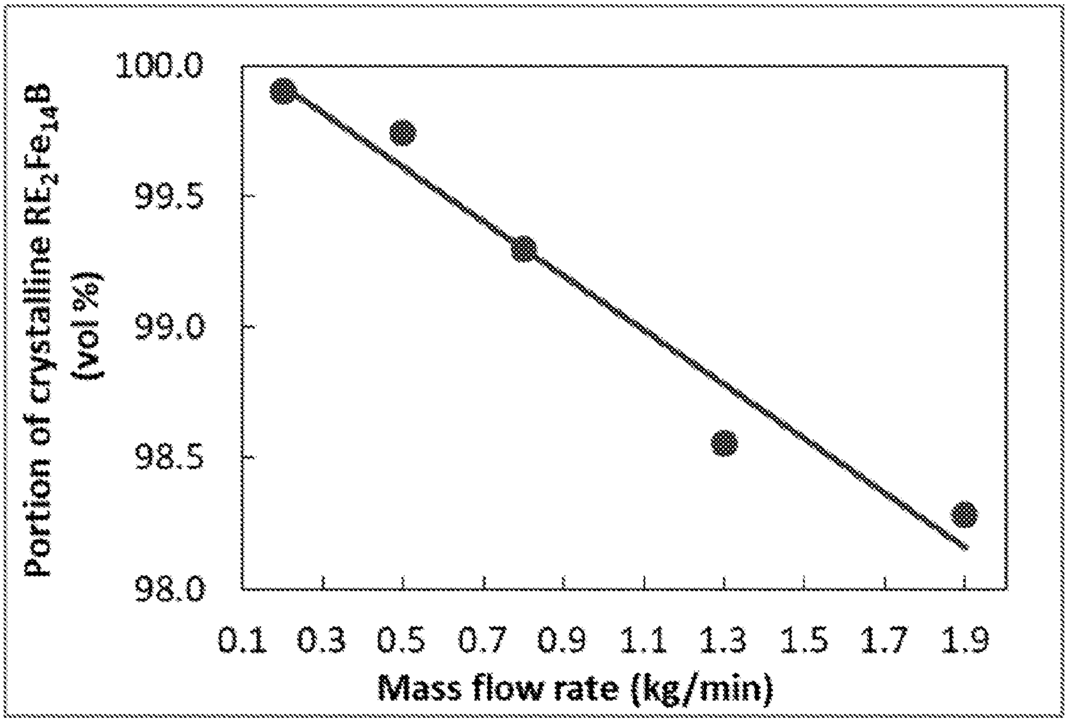

[Fig. 6]
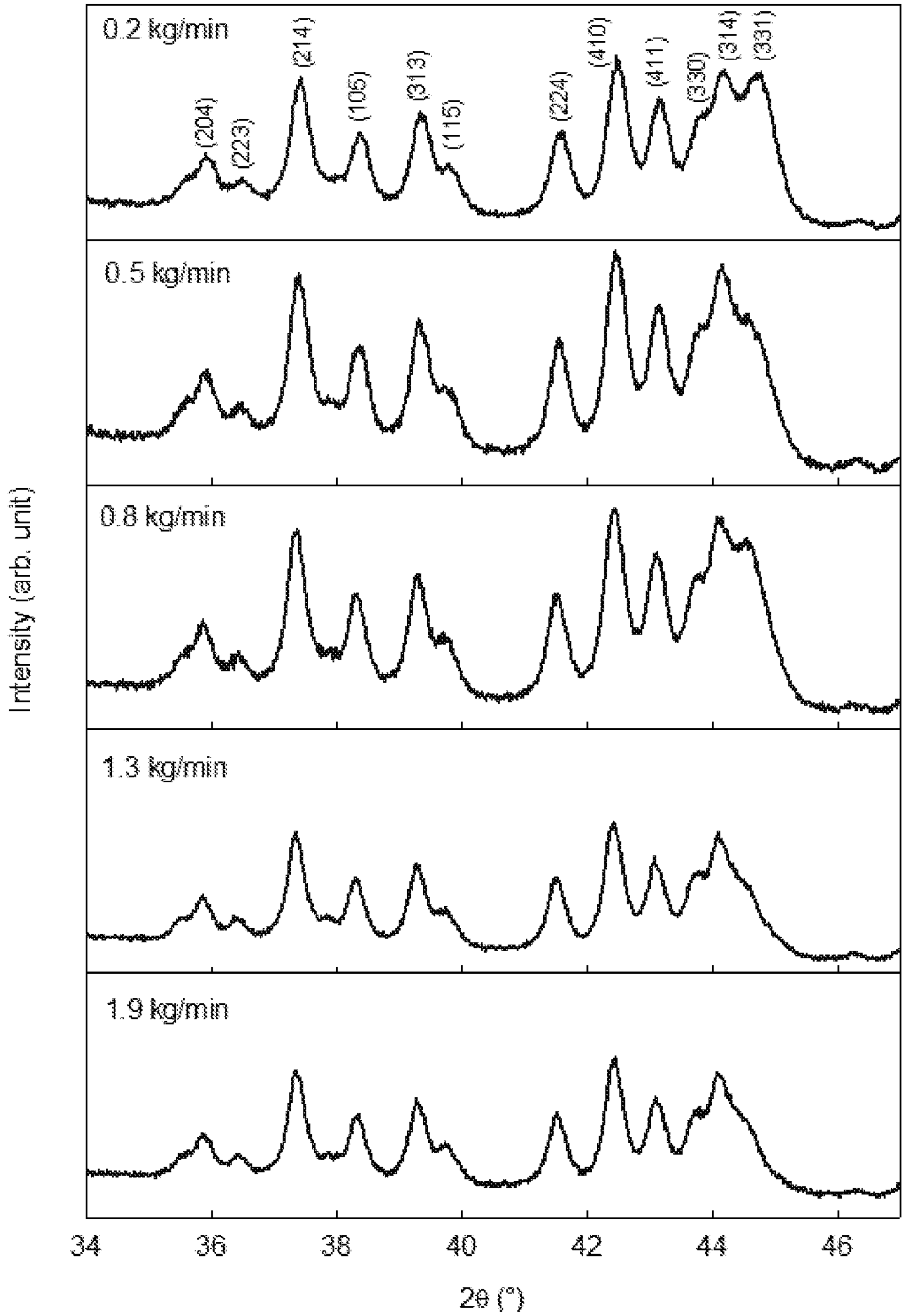

[Fig. 7]
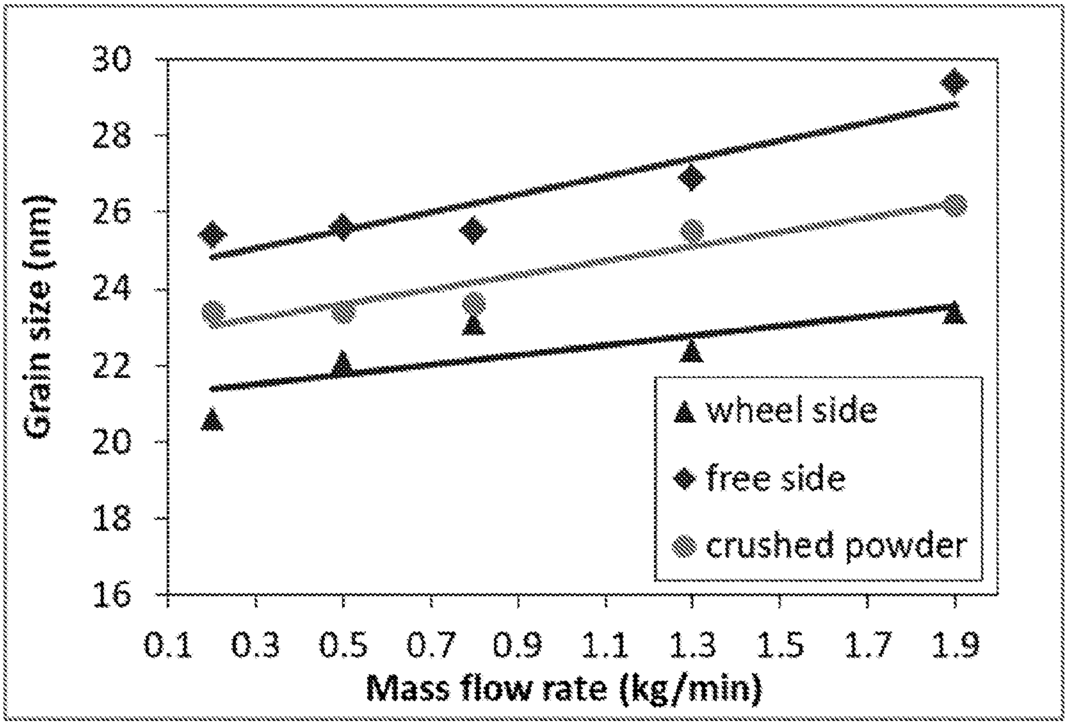

[Fig. 8]
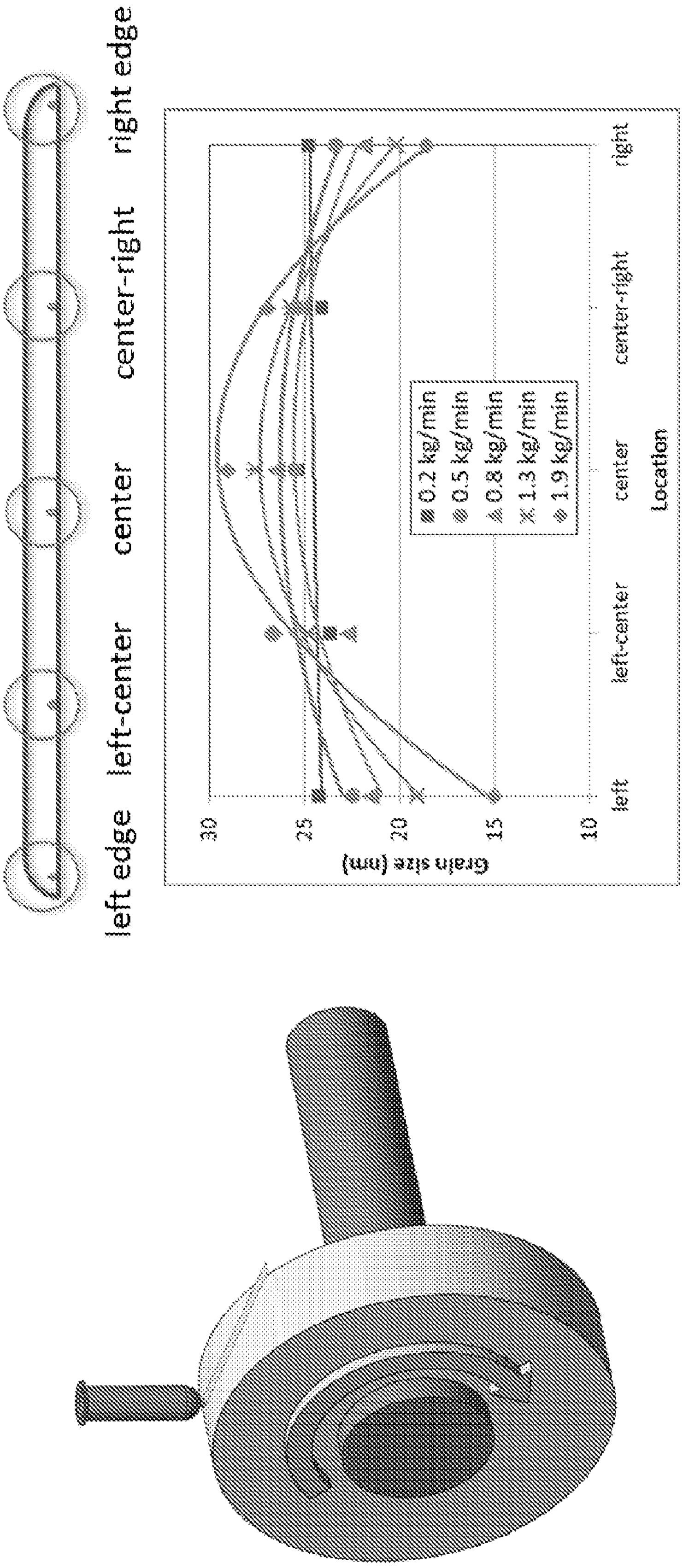

[Fig. 9]
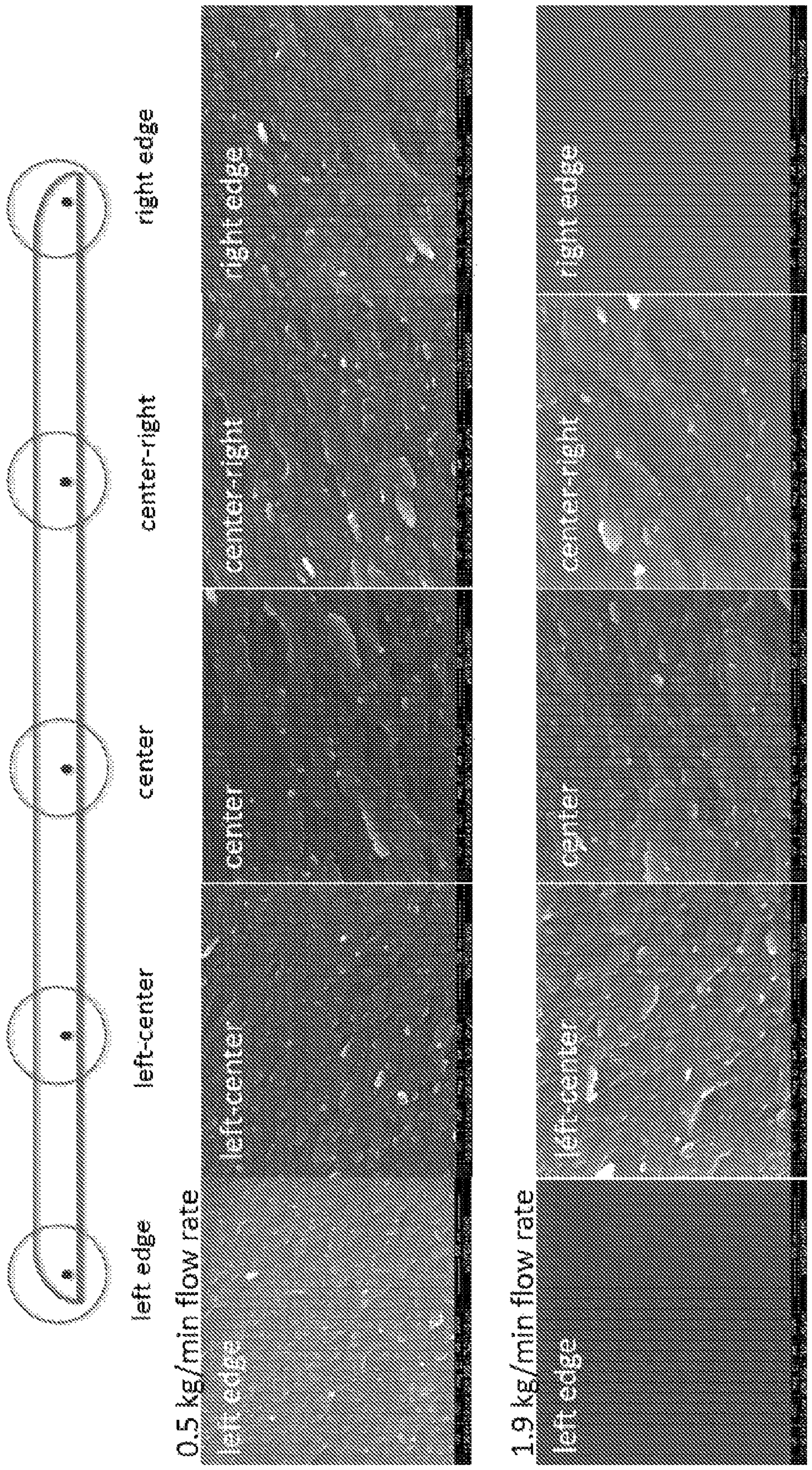

[Fig. 10]
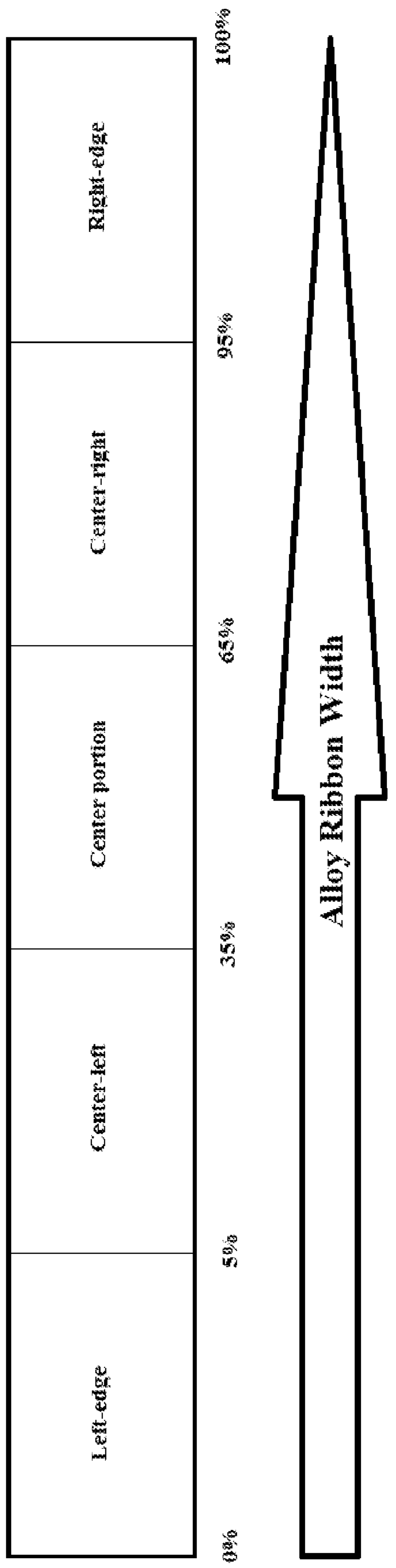

ALLOYS, MAGNETIC MATERIALS, BONDED MAGNETS AND METHODS FOR PRODUCING THE SAME

TECHNICAL FIELD

The present invention generally relates to alloys, magnetic materials, and bonded magnets. The present invention also relates to a method for producing such alloys, magnetic materials and bonded magnets.

BACKGROUND

Iron-based rare-earth magnets are used in numerous applications, including computer hardware, automobiles, consumer electronics, motors and household appliances. With the progress of technology, it is becoming increasingly necessary to produce magnets of improved magnetic performance. It is therefore desirable to have a process by which rare earth iron-based alloys and magnets are produced with improved magnetic performance.

There are several known methods for fabricating iron-based rare-earth magnets. In such methods, constituent metals are melted together and subsequently solidified. Solidification is achieved by different techniques which include ingot casting, strip casting and melt spinning. The solidified alloy may take the form of an ingot, flake, ribbon, or powder. Methods for fabricating magnets include sintering, hot pressing, hot deformation, and bonding.

The methods used to fabricate iron-based rare-earth magnets affect their magnetic properties and different process conditions in a given method also affect the magnetic properties. In a melt-spinning process, a molten alloy mixture is ejected onto the surface of spinning or rotating wheel. Upon contacting the wheel surface, the molten alloy mixture forms ribbons, which rapidly solidify into very fine nanoscale grains. The ribbons can be further crushed or comminuted before being used to produce plastic bonded magnets.

It is well known that a very fine and uniform microstructure in the melt-spun ribbon is critical for achieving high magnetic properties. Although current melt-spinning technology can produce very fine nanoscale microstructure, it has a main drawback: alloy ribbons produced by current industry practice of melt-spinning exhibit microstructure homogeneity variations between the ribbon edge area and the central area viewed from the ribbon cross section. This microstructural inhomogeneity is undesirable as it leads to lower magnetic properties of the alloys. Improvements in melt-spinning processes or products are therefore generally sought in two areas: (1) elimination of microstructure inhomogeneities to yield better magnetic properties; or (2) increasing production throughput while not further sacrificing homogeneity or properties.

There is therefore a need to provide a magnetic material and methods for forming such magnetic materials that overcomes, or at least ameliorates, one or more of the disadvantages described above.

SUMMARY

According to a first aspect of the present disclosure, there is provided an alloy with composition of Formula (I):

RE-Fe-M-B Formula (I)

wherein:

RE is one or more rare earth metals;

Fe is iron;

M is absent or one or more metals; and

B is boron;

wherein:

said alloy comprises at least 80 vol % $RE_2Fe_{14}B$ phase;

the average crystal grain size of the $RE_2Fe_{14}B$ phase is in the range of about 20 nm to about 40 nm; and the alloy is an alloy ribbon having a width measured from the left edge to a center portion to a right edge, and the average crystal $RE_2Fe_{14}B$ grain size difference between the center portion, and left and right edges of said alloy ribbon is less than 20%.

In a second aspect of the present disclosure, there is provided a method for preparing an alloy ribbon with composition of Formula (I):

RE-Fe-M-B Formula (I)

wherein:

RE is one or more rare earth metals;

Fe is iron;

M is absent or one or more metals; and

B is boron, comprising the steps of:

(i) ejecting a melt of an alloy with composition of Formula (I) onto a rotating wheel at a mass flow rate in the range of about 0.2 kg/min to about 1.0 kg/min; and (ii) quenching the melt using the rotating wheel to obtain said alloy ribbon.

Advantageously, the method of the present disclosure may produce alloy ribbons with a substantially uniform ribbon microstructure.

More advantageously, the method of the present disclosure may result in substantially uniform quenching of the alloy ribbon.

Further advantageously, the method of the present disclosure may produce alloy ribbons with $RE_2Fe_{14}B$ as the constituting crystalline phase. The disclosed alloys may comprise at least 80 vol %, at least 90 vol %, or at least 98 vol % $RE_2Fe_{14}B$ phase.

In a third aspect of the present disclosure, there is provided a magnetic material comprising a powder of the alloy of the first aspect, or a powder of the alloy ribbon prepared by the method of the second aspect.

In a fourth aspect of the present disclosure, there is provided a plastic bonded magnet comprising the magnetic material of the third aspect.

Advantageously, the disclosed magnetic materials or plastic bonded magnets may exhibit improved magnetic properties, for example, high remanence ($B_r$), energy product [$(BH)_{max}$] and coercivity ($H_{ci}$) values.

Definitions

The following words and terms used herein shall have the meaning indicated:

The term "rare earth" or "rare earth metal" as used herein refers to a rare earth element and may be cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb) or yttrium (Y).

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and subgeneric groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF EMBODIMENTS

As discussed above, bonded magnets, such as iron-based rare-earth magnets are used in numerous applications, including computer hardware, automobiles, consumer electronics and household appliances. It is beneficial for such magnets to have high $(BH)_{max}$, $B_r$ and $H_{ci}$ values.

Improved magnetic performance may be achieved by a magnetic material possessing a uniform microstructure. Conventional melt-spinning methods have difficulty in forming alloy ribbons with uniform microstructure between the ribbon edges and the center portion of the ribbon, as there are differences in cooling rate across the ribbon cross-section area which leads to microstructural non-homogeneity.

The inventors of the present invention have surprisingly found that having a low mass flow rate of the melt ejecting onto the surface of the melt-spinning wheel may form alloy ribbons with substantially uniform microstructure. Such alloy ribbons produced by the present invention advantageously exhibit high $(BH)_{max}$, $B_r$ and $H_{ci}$ values.

Exemplary, non-limiting embodiments of the disclosed alloys, magnetic materials, bonded magnets, and methods of making the same, will now be disclosed.

The present invention provides an alloy with composition of Formula (I):

RE-Fe-M-B    Formula (I)

wherein:

RE is one or more rare earth metals;

Fe is iron;

M is absent or one or more metals; and

B is boron.

As used herein, it is understood that the RE, Fe, M and B components in Formula (I) are present at various at % which make up a total of 100 at %. The present invention provides an alloy with composition of Formula (I):

RE-Fe-M-B    Formula (I)

wherein:

RE is one or more rare earth metals;

Fe is iron;

M is absent or one or more metals; and

B is boron;

wherein said alloy comprises at least 80 vol % $RE_2Fe_{14}B$ phase.

The present invention also provides an alloy with composition of Formula (I):

RE-Fe-M-B    Formula (I)

wherein:

RE is one or more rare earth metals;

Fe is iron;

M is absent or one or more metals; and

B is boron;

wherein said alloy comprises at least 80 vol % $RE_2Fe_{14}B$ phase; and wherein the average crystal grain size of the $RE_2Fe_{14}B$ phase is in the range of about 20 nm to about 40 nm.

The present invention further provides an alloy with composition of Formula (I):

RE-Fe-M-B    Formula (I)

wherein:

RE is one or more rare earth metals;

Fe is iron;

M is absent or one or more metals; and

B is boron;

wherein said alloy comprises at least 80 vol % $RE_2Fe_{14}B$ phase; and wherein the alloy is an alloy ribbon having a width measured from a left edge to a center portion to a right edge, and wherein the average crystal $RE_2Fe_{14}B$ grain size difference between the center portion, and left and right edges of said alloy ribbon is less than 20%.

The present invention also provides an alloy with composition of Formula (I):

RE-Fe-M-B    Formula (I)

wherein:

RE is one or more rare earth metals;

Fe is iron;

M is absent or one or more metals; and

B is boron;

wherein:

said alloy comprises at least 80 vol % $RE_2Fe_{14}B$ phase;

the average crystal grain size of the $RE_2Fe_{14}B$ phase is in the range of about 20 nm to about 40 nm; and the alloy is an alloy ribbon having a width measured from a left edge to a center portion to a right edge, and the average crystal $RE_2Fe_{14}B$ grain size difference between the center portion, and left and right edges of said alloy ribbon is less than 20%.

The present invention also provides an alloy with composition of Formula (Ia):

$RE_x\text{-}Fe_{(100-x-y-z)}\text{-}M_y\text{-}B_z$ Formula (Ia)

wherein:
RE is one or more rare earth metals;
Fe is iron;
M is absent or one or more metals;
B is boron; and
x, y, z are atom % in which 8.0≤x≤14.0, 0≤y≤2.0 and 5.0≤z≤7.0;
wherein said alloy comprises at least 80 vol % $RE_2Fe_{14}B$ phase.

The present invention further provides an alloy with composition of Formula (Ia):

$RE_x\text{-}Fe_{(100-x-y-z)}\text{-}M_y\text{-}B_z$ Formula (Ia)

wherein:
RE is one or more rare earth metals;
Fe is iron;
M is absent or one or more metals;
B is boron; and
x, y, z are atom % in which 8.0≤x≤14.0, 0≤y≤2.0 and 5.0≤z≤7.0;
wherein said alloy comprises at least 80 vol % $RE_2Fe_{14}B$ phase; and
wherein the average crystal grain size of the $RE_2Fe_{14}B$ phase is in the range of about 20 nm to about 40 nm.

The present invention also provides an alloy with composition of Formula (Ia):

$RE_x\text{-}Fe_{(100-x-y-z)}\text{-}M_y\text{-}B_z$ Formula (Ia)

wherein:
RE is one or more rare earth metals;
Fe is iron;
M is absent or one or more metals;
B is boron; and
x, y, z are atom % in which 8.0≤x≤14.0, 0≤y≤2.0 and 5.0≤z≤7.0;
wherein said alloy comprises at least 80 vol % $RE_2Fe_{14}B$ phase; and
wherein the alloy is an alloy ribbon having a width measured from a left edge to a center portion to a right edge, and wherein the average crystal $RE_2Fe_{14}B$ grain size difference between the center portion, and left and right edges of said alloy ribbon is less than 20%.

The present invention also provides an alloy with composition of Formula (Ia):

$RE_x\text{-}Fe_{(100-x-y-z)}\text{-}M_y\text{-}B_z$ Formula (Ia)

wherein:
RE is one or more rare earth metals;
Fe is iron;
M is absent or one or more metals;
B is boron; and
x, y, z are atom % in which 8.0≤x≤14.0, 0≤y≤2.0 and 5.0≤z≤7.0;
wherein:
said alloy comprises at least 80 vol % $RE_2Fe_{14}B$ phase;
the average crystal grain size of the $RE_2Fe_{14}B$ phase is in the range of about 20 nm to about 40 nm; and
the alloy is an alloy ribbon having a width measured from a left edge to a center portion to a right edge, and the average crystal $RE_2Fe_{14}B$ grain size difference between the center portion, and left and right edges of said alloy ribbon is less than 20%.

The alloy may comprise $RE_2Fe_{14}B$ phase as the main phase, and depending on the alloy rare earth metal content, the alloy may contain a small amount of a secondary phase, such as a RE-rich phase (e.g., when RE content is higher than about 11.77 at %), or an α-Fe phase (e.g., when RE content is lower than about 11.77 at %).

The alloy may comprise at least 80 vol % $RE_2Fe_{14}B$ phase. The disclosed alloy may comprise at least 80 vol %, at least 81 vol %, at least 82 vol %, at least 83 vol %, at least 84 vol %, at least 85 vol %, at least 86 vol %, at least 87 vol %, at least 88 vol %, at least 89 vol %, at least 90 vol %, at least at least 91 vol %, at least at least 92 vol %, at least at least 93 vol %, at least at least 94 vol %, at least 95 vol %, at least 96 vol %, at least 97 vol %, at least 90 vol %, or at least 99 vol % $RE_2Fe_{14}B$ phase. The disclosed alloy may comprise a $RE_2Fe_{14}B$ phase in the range of about 80 vol % to about 99 vol %, about 81 vol % to about 99 vol %, about 82 vol % to about 99 vol %, about 83 vol % to about 99 vol %, about 84 vol % to about 99 vol %, about 85 vol % to about 99 vol %, about 86 vol % to about 99 vol %, about 87 vol % to about 99 vol %, about 88 vol % to about 99 vol %, about 89 vol % to about 99 vol %, about 90 vol % to about 99 vol %, or about 91 vol % to about 99 vol %, about 92 vol % to about 99 vol %, about 93 vol % to about 99 vol %, about 94 vol % to about 99 vol %, about 95 vol % to about 99 vol %, about 96 vol % to about 99 vol %, about 97 vol % to about 99 vol %, about 98 vol % to about 99 vol %, about 80 vol % to about 98 vol %, about 80 vol % to about 97 vol %, about 80 vol % to about 96 vol %, about 80 vol % to about 95 vol %, about 80 vol % to about 94 vol %, about 80 vol % to about 93 vol %, about 80 vol % to about 92 vol %, about 80 vol % to about 91 vol %, about 80 vol % to about 90 vol %, about 80 vol % to about 89 vol %, about 80 vol % to about 88 vol %, about 80 vol % to about 87 vol %, about 80 vol % to about 86 vol %, about 80 vol % to about 85 vol %, about 80 vol % to about 84 vol %, about 80 vol % to about 83 vol %, about 80 vol % to about 82 vol %, about 80 vol % to about 81 vol %, about 97 vol % to about 99 vol %, or about 80 vol %, or about 81 vol %, or about 82 vol %, or about 83 vol %, or about 84 vol %, or about 85 vol %, or about 86 vol %, or about 87 vol %, or about 88 vol %, or about 89 vol %, or about 90 vol %, about 91 vol %, about 92 vol %, about 93 vol %, about 94 vol %, about 95 vol %, about 96 vol %, about 97 vol %, about 98 vol %, about 99 vol % $RE_2Fe_{14}B$ phase, or any range or value therein.

The $RE_2Fe_{14}B$ phase of the alloy may have an average crystal grain size in the range of about 20 nm to about 40 nm, or about 21 nm to about 40 nm, about 22 nm to about 40 nm, about 23 nm to about 40 nm, about 24 nm to about 40 nm, about 25 nm to about 40 nm, about 26 nm to about 40 nm, about 27 nm to about 40 nm, about 28 nm to about 40 nm, about 29 nm to about 40 nm, about 30 nm to about 40 nm, about 31 nm to about 40 nm, about 32 nm to about 40 nm, about 33 nm to about 40 nm, about 34 nm to about 40 nm, about 35 nm to about 40 nm, about 36 nm to about 40 nm, about 37 nm to about 40 nm, about 38 nm to about 40 nm, about 39 nm to about 40 nm, about 20 nm to about 39 nm, about 20 nm to about 38 nm, about 20 nm to about 37 nm, about 20 nm to about 36 nm, about 20 nm to about 35 nm, about 20 nm to about 34 nm, about 20 nm to about 33 nm, about 20 nm to about 32 nm, about 20 nm to about 31 nm, about 20 nm to about 30 nm, about 20 nm to about 29 nm, about 20 nm to about 28 nm, about 20 nm to about 27 nm, about 20 nm to about 26 nm, about 20 nm to about 25 nm, about 20 nm to about 24 nm, about 20 nm to about 23 nm, about 20 nm to about 22 nm, about 20 nm to about 21 nm, or about 20 nm, about 21 nm, about 22 nm, about 23 nm, about 24 nm, about 25 nm, about 26 nm, about 27 nm, about 28 nm, about 29 nm, about 30 nm, about 31 nm, about 32 nm, about 33 nm, about 34 nm, about 35 nm, about 36 nm, about 37 nm, about 38 nm, about 39 nm, about 40 nm, or any range or value therein.

The alloy may be a rapidly cooled alloy. The alloy may be an alloy ribbon. The alloy may be a rapidly cooled alloy ribbon.

The alloy ribbon may have a width of about 1 mm to about 5 mm measured from the left edge of the ribbon to the right edge of the ribbon. The width may be about 1 mm to about 5 mm, about 1 mm to about 4 mm, about 1 mm to about 3 mm, about 1 mm to about 2 mm, about 2 mm to about 5 mm, about 3 mm to about 5 mm, about 4 mm to about 5 mm, or about 1 mm, about 2 mm, about 3 mm, about 4 mm, about 5 mm, or any value or range therein.

The "left edge" of the alloy ribbon may be located at the leftmost portion of the alloy ribbon and may comprise from greater than 0% to about 10% of the width of the alloy ribbon. The "left edge" of the alloy ribbon may comprise greater than 0% to about 10%, about 1% to about 10%, about 2% to about 10%, about 3% to about 10%, about 4% to about 10%, about 5% to about 10%, about 6% to about 10%, about 7% to about 10%, about 8% to about 10%, about 9% to about 10%, greater than 0% to about 9%, greater than 0% to about 8%, greater than 0% to about 7%, greater than 0% to about 6%, greater than 0% to about 5%, greater than 0% to about 4%, greater than 0% to about 3%, greater than 0% to about 2%, or greater than than 0%, about 1%, about 2%, about 3%, about 4%, about 5%, about 6%, about 7%, about 8%, about 9%, about 10%, or any value or range therein. This means, that for an alloy ribbon of 1 mm width, the left edge of the ribbon is from greater than 0 mm to about 0.1 mm. For an alloy ribbon of 5 mm width, the left edge of the ribbon is greater than 0 mm to about 0.5 mm.

The "right edge" of the alloy ribbon may be located at the rightmost portion of the alloy ribbon and may comprise greater than 0% to about 10% of the width of the alloy ribbon. The "right edge" of the alloy ribbon may comprise greater than 0% to about 10%, about 1% to about 10%, about 2% to about 10%, about 3% to about 10%, about 4% to about 10%, about 5% to about 10%, about 6% to about 10%, about 7% to about 10%, about 8% to about 10%, about 9% to about 10%, greater than 0% to about 9%, greater than 0% to about 8%, greater than 0% to about 7%, greater than 0% to about 6%, greater than 0% to about 5%, greater than 0% to about 4%, greater than 0% to about 3%, greater than 0% to about 2%, or greater than 0%, about 1%, about 2%, about 3%, about 4%, about 5%, about 6%, about 7%, about 8%, about 9%, about 10%, or any value or range therein. This means, that for an alloy ribbon of 1 mm width, the right edge of the ribbon is from greater than 0 mm to about 0.1 mm. For an alloy ribbon of 5 mm width, the right edge of the ribbon is from greater than 0 mm to about 0.5 mm.

The "center portion" of the alloy ribbon may be located at the centre portion of the alloy ribbon and may comprise about 1% to about 40% of the width of the alloy ribbon (i.e. about 0.5% to about 20% of the width on either side of the centre line of the alloy ribbon). The "center edge" of the alloy ribbon may comprise about about 1% to about 40%, about 2% to about 40%, about 3% to about 40%, about 4% to about 40%, about 5% to about 40%, about 6% to about 40%, about 7% to about 40%, about 8% to about 40%, about 9% to about 40%, about 10% to about 40%, about 11% to about 40%, about 12% to about 40%, about 13% to about 40%, about 14% to about 40%, about 15% to about 40%, about 16% to about 40%, about 17% to about 40%, about 18% to about 40%, about 19% to about 40%, about 20% to about 40%, about 21% to about 40%, about 22% to about 40%, about 23% to about 40%, about 24% to about 40%, about 25% to about 40%, about 26% to about 40%, about 27% to about 40%, about 28% to about 40%, about 29% to about 40%, about 30% to about 40%, about 31% to about 40%, about 32% to about 40%, about 33% to about 40%, about 34% to about 40%, about 35% to about 40%, about 36% to about 40%, about 37% to about 40%, about 38% to about 40%, about 39% to about 40%, about 1% to about 39%, about 1% to about 38%, about 1% to about 37%, about 1% to about 36%, about 1% to about 35%, about 1% to about 34%, about 1% to about 33%, about 1% to about 32%, about 1% to about 31%, about 1% to about 30%, about 1% to about 29%, about 1% to about 28%, about 1% to about 27%, about 1% to about 26%, about 1% to about 25%, about 1% to about 24%, about 1% to about 23%, about 1% to about 22%, about 1% to about 21%, about 1% to about 20%, about 1% to about 19%, about 1% to about 18%, about 1% to about 17%, about 1% to about 16%, about 1% to about 15%, about 1% to about 14%, about 1% to about 13%, about 1% to about 12%, about 1% to about 11%, about 1% to about 10%, about 1% to about 9%, about 1% to about 8%, about 1% to about 7%, about 1% to about 6%, about 1% to about 5%, about 1% to about 4%, about 1% to about 3%, about 1% to about 2%, or about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, or any value or range therein. This means, that for an alloy ribbon of 1 mm width, the center portion of the ribbon is from about 0.01 mm to about 0.4 mm. For an alloy ribbon of 5 mm width, the right edge of the ribbon is from about 0.05 mm to about 2.0 mm.

Along the width of the alloy ribbon, and between the left-edge and centre portion, there may be a portion referred to herein as the "center-left" portion. Along the width of the alloy ribbon, and between the centre portion and the right-edge, there may be a portion referred to herein as the "center-right" portion.

The alloy ribbon may have a thickness of about 20 μm to about 50 μm. The thickness may be about 20 μm to about 50 μm, about 22 μm to about 50 μm, about 24 μm to about 50 μm, about 26 μm to about 50 μm, about 28 μm to about 50 μm, about 30 μm to about 50 μm, about 32 μm to about 50 μm, about 34 μm to about 50 μm, about 36 μm to about 50 μm, about 38 μm to about 50 μm, about 40 μm to about 50 μm, about 42 μm to about 50 μm, about 44 μm to about 50 μm, about 46 μm to about 50 μm, about 48 μm to about 50 μm, about 20 μm to about 48 μm, about 20 μm to about 46 μm, about 20 μm to about 44 μm, about 20 μm to about 42 μm, about 20 μm to about 40 μm, about 20 μm to about 38 μm, about 20 μm to about 36 μm, about 20 μm to about 34 μm, about 20 μm to about 32 μm, about 20 μm to about 30 μm, about 20 μm to about 28 μm, about 20 μm to about 26 μm, about 20 μm to about 24 μm, about 20 μm to about 22 μm, or about 20 μm, 22 μm, 24 μm, 26 μm, 28 μm, 30 μm, 32 μm, 34 μm, 36 μm, 38 μm, 40 μm, 42 μm, 44 μm, 46 μm, 48 μm, 50 μm, or any value or range therein.

The average $RE_2Fe_{14}B$ grain size at the center portion of the alloy ribbon may be in the range of about 25 nm to about 40 nm, or about 26 nm to about 40 nm, about 27 nm to about 40 nm, about 28 nm to about 40 nm, about 29 nm to about 40 nm, about 30 nm to about 40 nm, about 31 nm to about 40 nm, about 32 nm to about 40 nm, about 33 nm to about 40 nm, about 34 nm to about 40 nm, about 35 nm to about 40 nm, about 36 nm to about 40 nm, about 37 nm to about 40 nm, about 38 nm to about 40 nm, about 39 nm to about 40 nm, about 25 nm to about 39 nm, about 25 nm to about 38 nm, about 25 nm to about 37 nm, about 25 nm to about 36 nm, about 25 nm to about 35 nm, about 25 nm to about 34 nm, about 25 nm to about 33 nm, about 25 nm to about 32 nm, about 25 nm to about 31 nm, about 25 nm to about 30 nm, about 25 nm to about 29 nm, about 25 nm to about 28 nm, about 25 nm to about 27 nm, about 25 nm to about 26 nm, or about 25 nm, about 26 nm, about 27 nm, about 28 nm, about 29 nm, about 30 nm, about 31 nm, about 32 nm, about 33 nm, about 34 nm, about 35 nm, about 36 nm, about 37 nm, about 38 nm, about 39 nm, about 40 nm, or any range or value therein.

The average $RE_2Fe_{14}B$ grain size at the left right edge of the alloy ribbon may be about 20 nm to about 30 nm, or about 21 nm to about 30 nm, about 22 nm to about 30 nm, about 23 nm to about 30 nm, about 24 nm to about 30 nm, about 25 nm to about 30 nm, about 26 nm to about 30 nm, about 27 nm to about 30 nm, about 28 nm to about 30 nm, about 29 nm to about 30 nm, about 20 nm to about 29 nm, about 20 nm to about 28 nm, about 20 nm to about 27 nm, about 20 nm to about 26 nm, about 20 nm to about 25 nm, about 20 nm to about 24 nm, about 20 nm to about 23 nm, about 20 nm to about 22 nm, about 20 nm to about 21 nm, or about 20 nm, about 21 nm, about 22 nm, about 23 nm, about 24 nm, about 25 nm, about 26 nm, about 27 nm, about 28 nm, about 29 nm, about 30 nm, or any range or value therein. The average $RE_2Fe_{14}B$ grain size difference between the center portion left and right edges of the alloy ribbon may be in the range of less than or equal to 20%.

The average $RE_2Fe_{14}B$ grain size at the right edge of the alloy ribbon may be about 20 nm to about 30 nm, or about 21 nm to about 30 nm, about 22 nm to about 30 nm, about 23 nm to about 30 nm, about 24 nm to about 30 nm, about 25 nm to about 30 nm, about 26 nm to about 30 nm, about 27 nm to about 30 nm, about 28 nm to about 30 nm, about 29 nm to about 30 nm, about 20 nm to about 29 nm, about 20 nm to about 28 nm, about 20 nm to about 27 nm, about 20 nm to about 26 nm, about 20 nm to about 25 nm, about 20 nm to about 24 nm, about 20 nm to about 23 nm, about 20 nm to about 22 nm, about 20 nm to about 21 nm, or about 20 nm, about 21 nm, about 22 nm, about 23 nm, about 24 nm, about 25 nm, about 26 nm, about 27 nm, about 28 nm, about 29 nm, about 30 nm, or any range or value therein. The average $RE_2Fe_{14}B$ grain size difference between the center portion left and right edges of the alloy ribbon may be in the range of less than or equal to 20%.

The average $RE_2Fe_{14}B$ grain size difference between the center portion, and left and right edges of the alloy ribbon may be in the range of less than or equal to about 20%, less than about 19%, less than about 18%, less than about 17%, less than about 16%, less than about 15%, less than about 14%, less than about 13%, less than about 12%, less than about 11%, less than about 10%, less than about 9%, less than about 8%, less than about 7%, less than about 6%, less than about 5%, less than about 4%, less than about 3%, less than about 2%, less than about 1%, or in the range of about 1% to about 20%, about 2% to about 20%, about 3% to about 20%, about 4% to about 20%, about 5% to about 20%, about 6% to about 20%, about 7% to about 20%, about 8% to about 20%, about 9% to about 20%, about 10% to about 20%, about 11% to about 20%, about 12% to about 20%, about 13% to about 20%, about 14% to about 20%, about 15% to about 20%, about 16% to about 20%, about 17% to about 20%, about 18% to about 20%, about 19% to about 20%, about 1% to about 19%, about 1% to about 18%, about 1% to about 17%, about 1% to about 16%, about 1% to about 15%, about 1% to about 14%, about 1% to about 13%, about 1% to about 12%, about 1% to about 11%, about 1% to about 10%, about 1% to about 9%, about 1% to about 8%, about 1% to about 7%, about 1% to about 6%, about 1% to about 5%, about 1% to about 4%, about 1% to about 3%, about 1% to about 2%, or about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, or any value or range therein.

RE in formula (I) or (Ia) may be one or more rare earth metals. RE may be one, two, three, four, or five rare earth metals.

RE in formula (I) or (Ia) may be one or more rare earth metals selected from the group consisting of lanthanum (La), cerium (Ce), neodymium (Nd), praseodymium (Pr), yttrium (Y), gadolinium (Gd), terbium (Tb), dysoprium (Dy), holmium (Ho), and ytterbium (Yb).

RE in formula (I) or (Ia) may be one, two, or three rare earth metals selected from the group consisting of Nd, Pr, La, and Ce.

RE in formula (I) or (Ia) may be selected from the group consisting of:

(i) Nd;
(ii) Nd, Pr;
(iii) Nd, Pr, La;
(iv) Nd, Pr, Ce;
(v) Nd, Pr, Ce, La;
(vi) Nd, La;
(vii) Nd, Ce;
(viii) Nd, Ce, La;
(ix) Pr;
(x) Pr, La;
(xi) Pr, Ce; and
(xii) Pr, La, Ce.

M in formula (I) or (Ia) may be absent or one or more metals. M may be absent or one, two, three, four or five rare earth metals. M may be a transition metal or refractory metal.

M in formula (I) or (Ia) may be absent or one or more metals selected from the group consisting of zirconium (Zr), niobium (Nb), molybdenum (Mo), titanium (Ti), vanadium (V), chromium (Cr), manganese (Mn), hafnium (Hf), tantalum (Ta), tungsten (W), cobalt (Co), copper (Cu), gallium (Ga) and aluminum (Al). M may be one or more metals selected from the group consisting of Nb, Co, Al, and Zr.

x in Formula (Ia) may be $8.0 \leq x \leq 14.0$. x may be from about 8.0 to about 14.0, from about 8.5 to about 14.0, from about 9.0 to about 14.0, from about 9.5 to about 14.0, from about 10.0 to about 14.0, from about 10.5 to about 14.0, from about 11.0 to about 14.0, from about 11.5 to about 14.0, from about 12.0 to about 14.0, from about 12.5 to about 14.0, from about 13.0 to about 14.0, from about 13.5 to about 14.0, from about 8.0 to about 13.5, from about 8.0 to about 13.0, from about 8.0 to about 12.5, from about 8.0 to about 12.0, from about 8.0 to about 11.5, from about 8.0 to about 11.0, from about 8.0 to about 10.5, from about 8.0 to about 10.0, from about 8.0 to about 9.5, from about 8.0 to about 9.0, from about 8.0 to about 8.5, or about 8.0, about 8.1, about 8.2, about 8.3, about 8.4, about 8.5, about 8.6, about 8.7, about 8.8, about 8.9, about 9.0, about 9.1, about 9.2, about 9.3, about 9.4, about 9.5, about 9.5, about 9.6, about 9.7, about 9.8, about 9.9, about 10.0, about 10.1, about 10.2, about 10.3, about 10.4, about 10.5, about 10.6, about 10.7, about 10.8, about 10.9, about 11.0, about 11.1, about 11.2, about 11.3, about 11.4, about 11.5, about 11.6, about 11.7, about 11.8, about 11.9, about 12.0, about 12.1, about 12.2, about 12.3, about 12.4, about 12.5, about 12.6, about 12.7, about 12.8, about 12.9, about 13.0, about 13.1, about 13.2, about 13.3, about 13.4, about 13.5, about 13.6, about 13.7, about 13.8, about 13.9, about 14.0, or any value or range therein.

y in Formula (Ia) may be $0 \leq y \leq 2.0$. y may be from about 0 to about 2.0, from about 0 to about 1.8, from about 0 to about 1.6, from about 0 to about 1.4, from about 0 to about 1.2, from about 0 to about 1.0, from about 0 to about 0.8, from about 0 to about 0.6, from about 0 to about 0.4, from about 0 to about 0.2, from about 0.2 to about 2.0, from about 0.4 to about 2.0, from about 0.6 to about 2.0, from about 0.8 to about 2.0, from about 1.0 to about 2.0, from about 1.2 to about 2.0, from about 1.4 to about 2.0, from about 1.6 to about 2.0, from about 1.8 to about 2.0, or 0, about 0.1, about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, or any value or range therein.

z in Formula (Ia) may be $5.0 \leq z \leq 7.0$. z may be from about 5.0 to about 7.0, from about 5.0 to about 6.8, from about 5.0 to about 6.6, from about 5.0 to about 6.4, from about 5.0 to about 6.2, from about 5.0 to about 6.0, from about 5.0 to about 5.8, from about 5.0 to about 5.6, from about 5.0 to about 5.4, from about 5.0 to about 5.2, from about 5.2 to about 7.0, from about 5.4 to about 7.0, from about 5.6 to about 7.0, from about 5.8 to about 7.0, from about 6.0 to about 7.0, from about 6.2 to about 7.0, from about 6.4 to about 7.0, from about 6.6 to about 7.0, from about 6.8 to about 7.0, or about 5.0, or about 5.1, about 5.2, or about 5.3, about 5.4, or about 5.5, about 5.6, or about 5.7, about 5.8, or about 5.9, about 6.0, about 6.1, about 6.2, about 6.3, about 6.4, about 6.5, about 6.6, about 6.7, about 6.8, about 6.9, about 7.0, or any value or range therein.

The alloy may have a composition selected from the group consisting of:

(i) Nd—Fe—Nb—B;
(ii) Nd—Fe—Co—B;
(iii) (NdPrLa)—Fe—Al—B;
(iv) (NdPr)—Fe—Zr—B;
(v) (NdPrCe)—Fe—Zr—B;
(vi) Nd—Fe—Co—B;
(vii) Nd—Fe—B;
(viii) (NdPr)—Fe—B;
(ix) (NdPrLaCe)—Fe—B;
(x) (NdPr)—Fe—Co—B; and
(xi) (NdPr)—Fe—Nb—B.

The boron content of the alloy may be less than about 10 at %. The boron content may be less than about 10 at %, about 9 at %, about 8 at %, about 7 at %, about 6 at %, about 5 at %, about 4 at %, about 3 at %, about 2 at %, about 1 at %, or in the range of about 1 at % to about 10 at %, about 2 at % to about 10 at %, about 3 at % to about 10 at %, about 4 at % to about 10 at %, about 5 at % to about 10 at %, about 6 at % to about 10 at %, about 7 at % to about 10 at %, about 8 at % to about 10 at %, about 9 at % to about 10 at %, about 1 at % to about 9 at %, about 1 at % to about 8 at %, about 1 at % to about 7 at %, about 1 at % to about 6 at %, about 1 at % to about 5 at %, about 1 at % to about 4 at %, about 1 at % to about 3 at %, about 1 at % to about 2 at %, or about 1 at %, about 2 at %, about 3 at %, about 4 at %, about 5 at %, about 6 at %, about 7 at %, about 8 at %, about 9 at %, about 10 at %, or any range or value therein.

The alloy may have a composition selected from the group consisting of:

(i) $Nd_{11.9}Fe_{81.0}Nb_{1.2}B_{5.9}$;
(ii) $Nd_{11.6}Fe_{80.3}Co_{2.4}B_{5.7}$;
(iii) $(Nd_{0.75}Pr_{0.25})_{9.9}La_{1.9}Fe_{81.6}Al_{1.0}B_{5.6}$;
(iv) $(Nd_{0.75}Pr_{0.25})_{10.8}Fe_{81.9}Zr_{1.0}B_{6.3}$;
(v) $(Nd_{0.75}Pr_{0.25})_{6.8}Ce_{4.6}Fe_{81.3}Zr_{1.0}B_{6.3}$;
(vi) $Nd_{12.0}Fe_{76.3}Co_{5.9}B_{5.8}$;
(vii) $Nd_{11.7}Fe_{82.6}B_{5.7}$;
(viii) $(Nd_{0.75}Pr_{0.25})_{11.2}Fe_{83.4}B_{5.4}$;
(ix) $(Nd_{0.75}Pr_{0.25})_{10.4}Fe_{84.1}B_{5.5}$; and
(x) $(Nd_{0.75}Pr_{0.25})_{6.0}La_{3.0}Ce_{3.0}Fe_{81.8}B_{6.2}$.

The present invention also relates to a method for preparing an alloy ribbon with composition of Formula (I):

RE-Fe-M-B    Formula (I)

wherein:
RE is one or more rare earth metals;
Fe is iron;
M is absent or one or more metals; and
B is boron,
comprising the steps of:
(i) ejecting a melt of an alloy with composition of Formula (I) onto a rotating wheel at a mass flow rate in the range of about 0.2 kg/min to about 1.8 kg/min, preferably about 0.2 kg/min to about 1.0 kg/min; and
(ii) quenching the melt using the rotating wheel to obtain said alloy ribbon.

The present invention also relates to a method for preparing an alloy ribbon with composition of Formula (Ia):

$RE_x\text{-}Fe_{(100\text{-}x\text{-}y\text{-}z)}\text{-}M_y\text{-}B_z$    Formula (Ia)

wherein:
RE is one or more rare earth metals;
Fe is iron;
M is absent or one or more metals; and
B is boron;
x, y, z are atom % in which $8.0 \leq x \leq 14.0$, $0 \leq y \leq 2.0$ and $5.0 \leq z \leq 7.0$;
comprising the steps of:
(i) ejecting a melt of an alloy with composition of Formula (Ia) onto a rotating wheel at a mass flow rate in the range of about 0.2 kg/min to about 1.8 kg/min, preferably about 0.2 kg/min to about 1. 0 kg/min; and
(ii) quenching the melt using the rotating wheel to obtain said alloy ribbon.

The present invention also relates to an alloy ribbon prepared by the method as disclosed herein.

The mass flow rate of the melt flowing onto the rotating wheel may be in the range of about 0.2 kg/min to about 1.90 kg/min. The mass flow rate may be in the range of about 0.30 kg/min to about 1.90 kg/min, about 0.40 kg/min to about 1.90 kg/min, about 0.50 kg/min to about 1.90 kg/min, about 0.60 kg/min to about 1.90 kg/min, about 0.70 kg/min to about 1.90 kg/min, about 0.80 kg/min to about 1.90 kg/min, about 0.90 kg/min to about 1.90 kg/min, about 1.00 kg/min to about 1.90 kg/min, about 1.10 kg/min to about 1.90 kg/min, about 1.20 kg/min to about 1.90 kg/min, about 1.30 kg/min to about 1.90 kg/min, about 1.40 kg/min to about 1.90 kg/min, about 1.50 kg/min to about 1.90 kg/min, about 1.60 kg/min to about 1.90 kg/min, about 1.70 kg/min to about 1.90 kg/min, about 1.80 kg/min to about 1.90 kg/min, about 0.20 kg/min to about 1.80 kg/min, about 0.20 kg/min to about 1.70 kg/min, about 0.20 kg/min to about 1.60 kg/min, about 0.20 kg/min to about 1.50 kg/min, about 0.20 kg/min to about 1.40 kg/min, about 0.20 kg/min to about 1.30 kg/min, about 0.20 kg/min to about 1.20 kg/min, about 0.20 kg/min to about 1.10 kg/min, about 0.20 kg/min to about 1.00 kg/min, about 0.20 kg/min to about 0.90 kg/min, about 0.20 kg/min to about 0.80 kg/min, about 0.20 kg/min to about 0.70 kg/min, about 0.20 kg/min to about 0.60 kg/min, about 0.20 kg/min to about 0.50 kg/min, about 0.20 kg/min to about 0.40 kg/min, about 0.20 kg/min to about 0.30 kg/min, about 0.20 kg/min to about 1.00 kg/min, about 0.30 kg/min to about 1.00 kg/min, about 0.40 kg/min to about 1.00 kg/min, about 0.50 kg/min to about 1.00 kg/min, about 0.60 kg/min to about 1.00 kg/min, about 0.70 kg/min to about 1.00 kg/min, about 0.80 kg/min to about 1.00 kg/min, about 0.90 kg/min to about 1.00 kg/min, about 0.20 kg/min to about 0.90 kg/min, about 0.20 kg/min to about 0.80 kg/min, about 0.20 kg/min to about 0.70 kg/min, about 0.20 kg/min to about 0.60 kg/min, about 0.20 kg/min to about 0.50 kg/min, about 0.20 kg/min to about 0.40 kg/min, about 0.20 kg/min to about 0.30 kg/min, or about 0.20 kg/min, about 0.30 kg/min, about 0.40 kg/min, about 0.50 kg/min, about 0.60 kg/min, about 0.70 kg/min, about 0.80 kg/min, about 0.90 kg/min, about 1.00 kg/min, about 1.10 kg/min, about 1.20 kg/min, about 1.30 kg/min, about 1.40 kg/min, about 1.50 kg/min, about 1.60 kg/min, about 1.70 kg/min, about 1.80 kg/min, about 1.90 kg/min, or any range or value therein.

The inventors of the present invention have surprisingly found that having a low mass flow rate of the melt ejecting onto the surface of the melt-spinning or rotating wheel may lead to alloy ribbons with a more uniform microstructure and higher magnetic performance.

The melt ejecting onto the rotating wheel may be further optimally quenched by adjusting the wheel speed. The wheel may be rotating at a speed in the range of about 20 m/s to about 45 m/s, about 25 m/s to about 45 m/s, 30 m/s to about 45 m/s, 35 m/s to about 45 m/s, 40 m/s to about 45 m/s, 20 m/s to about 40 m/s, 20 m/s to about 35 m/s, 20 m/s to about 30 m/s, 20 m/s to about 25 m/s, or about 20 m/s, or about 21 m/s, or about 22 m/s, or about 23 m/s, or about 24 m/s, about 25 m/s, or about 26 m/s, or about 27 m/s, or about 28 m/s, or about 29 m/s, about 30 m/s, about 31 m/s, about 32 m/s, about 33 m/s, about 34 m/s, about 35 m/s, about 36 m/s, about 37 m/s, about 38 m/s, about 39 m/s, about 40 m/s, about 41 m/s, about 42 m/s, about 43 m/s, about 44 m/s, about 45 m/s, or any range or value therein.

When the mass flow rate of the melt ejecting onto the rotating wheel is 0.20 kg/min, the wheel may be rotating at a speed in the range of about 20 m/s to about 25 m/s. When the mass flow rate of the melt ejecting onto the rotating wheel is 0.50 kg/min, the wheel may be rotating at a speed in the range of about 25 m/s to about 30 m/s. When the mass flow rate of the melt ejecting onto the rotating wheel is 0.80 kg/min, the wheel may be rotating at a speed in the range of about 30 m/s to about 35 m/s. When the mass flow rate of the melt ejecting onto the rotating wheel is 1.30 kg/min, the wheel may be rotating at a speed in the range of about 35 m/s to about 40 m/s. When the mass flow rate of the melt ejecting onto the rotating wheel is 1.90 kg/min, the wheel may be rotating at a speed in the range of about 40 m/s to about 45 m/s.

When the mass flow rate of the melt ejecting onto the rotating wheel is 0.20 kg/min, the wheel may be rotating at a speed of about 20 m/s, about 21 m/s, about 22 m/s, about 23 m/s, about 24 m/s, or about 25 m/s. When the mass flow rate of the melt ejecting onto the rotating wheel is 0.50 kg/min, the wheel may be rotating at a speed in the range of about 25 m/s, about 26 m/s, about 27 m/s, about 28 m/s, about 29 m/s, or about 30 m/s. When the mass flow rate of the melt ejecting onto the rotating wheel is 0.80 kg/min, the wheel may be rotating at a speed in the range of about 30 m/s, about 31 m/s, about 32 m/s, about 33 m/s, about 34 m/s, or about 35 m/s. When the mass flow rate of the melt ejecting onto the rotating wheel is 1.30 kg/min, the wheel may be rotating at a speed in the range of about 35 m/s, about 36 m/s, about 37 m/s, about 38 m/s, about 39 m/s, or about 40 m/s. When the mass flow rate of the melt ejecting onto the rotating wheel is 1.90 kg/min, the wheel may be rotating at a speed in the range of about 40 m/s, about 41 m/s, about 42 m/s, about 43 m/s, about 44 m/s, or about 45 m/s.

The melt may be ejected onto the rotating wheel through one or more nozzles. The mass flow rate of the melt flowing onto the rotating wheel may be controlled by controlling the diameter of said nozzle(s).

The diameter of the one or more nozzles may be in the range of about 0.5 mm to about 1.4 mm, or about 0.6 mm to about 1.4 mm, about 0.7 mm to about 1.4 mm, about 0.8 mm to about 1.4 mm, about 0.9 mm to about 1.4 mm, about 1.0 mm to about 1.4 mm, about 1.1 mm to about 1.4 mm, about 1.2 mm to about 1.4 mm, about 1.3 mm to about 1.4 mm, about 0.5 mm to about 1.3 mm, about 0.5 mm to about 1.2 mm, about 0.5 mm to about 1.1 mm, about 0.5 mm to about 1.0 mm, about 0.5 mm to about 0.9 mm, about 0.5 mm to about 0.8 mm, about 0.5 mm to about 0.7 mm, about 0.5 mm to about 0.6 mm, or about 0.5 mm, about 0.6 mm, about 0.7 mm, about 0.8 mm, about 0.9 mm, about 1.0 mm, about 1.1 mm, about 1.2 mm, about 1.3 mm, about 1.4 mm, or any value or range therein.

When the mass flow rate of the melt ejecting onto the rotating wheel is 0.20 kg/min, the nozzle diameter may be 0.5 mm. When the mass flow rate of the melt ejecting onto the rotating wheel is 0.50 kg/min, the nozzle diameter may be 0.7 mm. When the mass flow rate of the melt ejecting onto the rotating wheel is 0.80 kg/min, the nozzle diameter may be 1.0 mm. When the mass flow rate of the melt ejecting onto the rotating wheel is 1.30 kg/min, the nozzle diameter may be 1.2 mm. When the mass flow rate of the melt ejecting onto the rotating wheel is 1.90 kg/min, the nozzle diameter may be 1.4 mm.

Step (ii) may comprise a melt spinning process.

The present disclosure also relates to a magnetic material comprising a powder of the alloy with the composition disclosed herein, or a powder of the alloy prepared by the method disclosed herein.

The present disclosure further relates to a plastic bonded magnet comprising the magnetic material disclosed herein.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 1 shows demagnetization curves for a: $Nd_{11.6}Fe_{80.3}Co_{2.4}B_{5.7}$ alloy (Sample 2 in Table 3); and b: $Nd_{11.9}Fe_{81}Nb_{1.2}B_{5.9}$ alloy (Sample 1 in Table 3), at different mass flow rates.

FIG. 2 is a graph showing $(BH)_{max}$ (kJ/m$^3$) against mass flow rate (kg/min) for a: $Nd_{11.6}Fe_{80.3}Co_{2.4}B_{5.7}$ alloy (Sample 2 in Table 3); and b: $Nd_{11.9}Fe_{81}Nb_{1.2}B_{5.9}$ alloy (Sample 1 in Table 3).

FIG. 3 is a graph showing wheel speed (m/s) against mass flow rate (kg/min) for a: $Nd_{11.6}Fe_{80.3}Co_{2.4}B_{5.7}$ alloy (Sample 2 in Table 3); and b: $Nd_{11.9}Fe_{81}Nb_{1.2}B_{5.9}$ alloy (Sample 1 in Table 3).

FIG. 4 is a graph showing ribbon thickness (μm) or ribbon width (μm) against mass flow rate (kg/min) for a: $Nd_{11.6}Fe_{80.3}Co_{2.4}B_{5.7}$ alloy (Sample 2 in Table 3); and b: $Nd_{11.9}Fe_{81}Nb_{1.2}B_{5.9}$ alloy (Sample 1 in Table 3).

FIG. 5 is a graph showing portion of crystalline $RE_2Fe_{14}B$ phase (vol %) against mass flow rate (kg/min) for $Nd_{11.6}Fe_{80.3}Co_{2.4}B_{5.7}$ alloy (Sample 2 in Table 3).

FIG. 6 is a graph showing X-ray diffraction pattern against mass flow rate (kg/min) for $Nd_{11.6}Fe_{80.3}Co_{2.4}B_{5.7}$ alloy (Sample 2 in Table 3).

FIG. 7 is a graph showing average grain size of the $RE_2Fe_{14}B$ phase (nm) against mass flow rate (kg/min) for $Nd_{11.6}Fe_{80.3}Co_{2.4}B_{5.7}$ alloy (Sample 2 in Table 3).

FIG. 8 shows the average grain size across the width of an alloy ribbon (from left-edge, center portion, to right-edge) at 0.2 kg/min mass flow rare, 0.5 kg/min mass flow rate, 0.8 kg/min mass flow rate, 1.3 kg/min mass flow rate and 1.9 kg/min mass flow rate for $Nd_{11.6}Fe_{80.3}Co_{2.4}B_{5.7}$ alloy (Sample 2 in Table 3).

FIG. 9 shows scanning electron microscope (SEM) images of an alloy ribbon (from left-edge, center portion, to right-edge) at 0.5 kg/min mass flow rate and 1.9 kg/min mass flow rate for $Nd_{11.6}Fe_{80.3}Co_{2.4}B_{5.7}$ alloy (Sample 2 in Table 3).

FIG. 10 is an exemplary depiction of the sections that make up the width of an alloy ribbon of the present invention.

EXAMPLES

Non-limiting examples of the invention will be further described in greater detail by reference to specific Examples, which should not be construed as in any way limiting the scope of the invention.

Example 1

General Method for Preparing Alloys

A rapidly solidified alloy of composition $Nd_{11.6}Fe_{80.3}Co_{2.4}B_{5.7}$ was prepared by weighing the appropriate amount of raw materials (Nd, Fe, Co, Fe—B) according to the composition formula with a total weight of 100 grams, placing all the raw materials into an arc-melter, melting the respective raw materials under argon atmosphere and cooling it to obtain ingots. 1% extra amount of Nd was added prior to melting to compensate for the melting loss. The alloy ingots were flipped and re-melted four times to ensure homogeneity.

The ingots were then broken into pieces and loaded into a crucible tube with a small nozzle underneath and placed into a melt-spinner. The alloy ingots were heated up and re-melted in argon atmosphere and ejected onto a rotating metal wheel to form ribbons. The ejection temperature was about 1400° C. to 1600° C., the ejection pressure was about 200 torr to 500 ton, the nozzle size was about 0.5 mm to 1.4 mm, and the wheel speed was about 20 m/s to 45 m/s. The ribbons were crushed to −40 mesh powder by a twin-roller crusher.

A rapidly solidified alloy of composition $Nd_{11.9}Fe_{81}Nb_{1.2}B_{5.9}$ was prepared in a similar way as described above.

Thereafter, the magnetic properties of the rapidly solidified $Nd_{11.6}Fe_{80.3}Co_{2.4}B_{5.7}$ alloy powder and $Nd_{11.9}Fe_{81}Nb_{1.2}B_{5.9}$ alloy powder were measured with a Lakeshore vibrating sample magnetometer (VSM). A demagnetization factor of 0.21 was used to correct the shape demagnetization effect in the powders. The results are shown in FIG. 1*a*, Table 1 ($Nd_{11.6}Fe_{80.3}Co_{2.4}B_{5.7}$ alloy) and FIG. 1*b*, Table 2 ($Nd_{11.9}Fe_{81}Nb_{1.2}B_{5.9}$ alloy):

TABLE 1

| Mass flow rate (kg/min) | $B_r$ (mT) | $H_{ci}$ (kA/m) | $(BH)_{max}$ (kJ/m$^3$) | $S_q$ (%) |
|---|---|---|---|---|
| 0.2 | 919 | 800 | 140 | 83.3 |
| 0.5 | 913 | 793 | 137 | 82.6 |
| 0.8 | 908 | 790 | 133 | 81.1 |
| 1.3 | 901 | 775 | 129 | 79.9 |
| 1.9 | 891 | 772 | 125 | 79.1 |

TABLE 2

| Mass flow rate (kg/min) | $B_r$ (mT) | $H_{ci}$ (kA/m) | $(BH)_{max}$ (kJ/m$^3$) | $S_q$ (%) |
|---|---|---|---|---|
| 0.2 | 869 | 1002 | 127 | 84.5 |
| 0.5 | 865 | 1001 | 125 | 84.0 |
| 0.8 | 857 | 977 | 123 | 84.2 |
| 1.3 | 848 | 978 | 119 | 83.2 |
| 1.9 | 835 | 967 | 115 | 82.9 |

It can be seen from Table 1 and Table 2 that higher magnetic properties ($B_r$, $H_{ci}$ and $(BH)_{max}$) were obtained at lower mass flow rate for both $Nd_{11.6}Fe_{80.3}Co_{2.4}B_{5.7}$ alloy and $Nd_{11.9}Fe_{81}Nb_{1.2}B_{5.9}$ alloy. Additionally, as shown in the demagnetization curves of FIG. 1, squareness ($S_q$, defined as $(BH)_{max}/B_r^2$) of the demagnetization curves improved with decreasing mass flow rate.

With reference to FIG. 2, it was also shown that $(BH)_{max}$ increases linearly as mass flow rate decreases. It was shown that there is a 7 to 9 kJ/m$^3$ increase per kg/min mass flow reduction.

Example 2

Magnetic Properties of Various other Alloys

Various other rapidly solidified alloys with various types of rare earth metals (Nd, Pr, NdPr, La, Ce, . . . ), various type of additives (Co, Nb, Zr,), and various amounts of constituting $RE_2Fe_{14}B$ phase were made according to the method in Example 1. Thereafter, the $(BH)_{max}$ of the rapidly solidified alloys at different mass flow rates were measured. The results are shown in Table 3.

TABLE 3

| Sample no. | Alloy (at %) | $RE_2Fe_{14}B$ amount (vol %) | $(BH)_{max}$ at mass flow rate of 1.9 kg/min ($kJ/m^3$) | $(BH)_{max}$ at mass flow rate of 0.2 kg/min ($kJ/m^3$) | $\Delta(BH)_{max}$ ($kJ/m^3$) |
|---|---|---|---|---|---|
| 1 | $Nd_{11.9}Fe_{81.0}Nb_{1.2}B_{5.9}$ | 99.8 | 115 | 127 | 12 |
| 2 | $Nd_{11.6}Fe_{80.3}Co_{2.4}B_{5.7}$ | 98.9 | 125 | 140 | 11 |
| 3 | $(Nd_{0.75}Pr_{0.25})_{9.9}La_{1.9}Fe_{81.6}Al_1B_{5.6}$ | 99.9 | 106 | 116 | 10 |
| 4 | $(Nd_{0.75}Pr_{0.25})_{10.8}Fe_{81.9}Zr_1B_{6.3}$ | 99.9 | 119 | 133 | 14 |
| 5 | $(Nd_{0.75}Pr_{0.25})_{6.8}Ce_{4.6}Fe_{81.3}Zr_1B_{6.3}$ | 99.2 | 95 | 101 | 6 |
| 6 | $Nd_{12.0}Fe_{76.3}Co_{5.9}B_{5.8}$ | 99.7 | 130 | 142 | 12 |
| 7 | $Nd_{11.7}Fe_{82.6}B_{5.7}$ | 99.4 | 120 | 131 | 11 |
| 8 | $(Nd_{0.75}Pr_{0.25})_{11.2}Fe_{83.4}B_{5.4}$ | 95.4 | 120 | 129 | 9 |
| 9 | $(Nd_{0.75}Pr_{0.25})_{10.4}Fe_{84.1}B_{5.5}$ | 88.8 | 120 | 128 | 8 |
| 10 | $(Nd_{0.75}Pr_{0.25})_{6.0}La_{3.0}Ce_{3.0}Fe_{81.8}B_{6.2}$ | 99.7 | 89 | 98 | 9 |

As shown in Table 3, remarkably higher $(BH)_{max}$ values were achieved for all the alloys when melt-spun at a low mass flow rate. It was shown that a 6 to 14 $kJ/m^3$ increase was achieved in $(BH)_{max}$ by reducing mass flow rate from 1.9 kg/min to 0.2 kg/min.

Example 3

Wheel Speed Versus Mass Flow Rate

It was found that wheel speed could be adjusted to achieve optimal quenching of the alloy ribbon. By "optimal quenching", it is meant that the ribbon was quenched at an optimal cooling rate by adjusting the wheel speed so that the obtained alloy ribbons had the finest and most uniform nanoscale grains and therefore highest magnetic properties. In contrast, "under quench" refers to a cooling rate that is too slow leading to a resultant grain size that is very large, whereas "over-quench" refers to a cooling rate that is too fast leading to the formation of an amorphous phase. Both under-quenching and over-quenching causes lower magnetic properties.

FIG. 3 and Table 4 show that the wheel speed for optimal quenching is in the range of 20 m/s to 45 m/s for the $Nd_{11.6}Fe_{80.3}Co_{2.4}B_{5.7}$ alloy, and 15 m/s to 30 m/s for the $Nd_{11.9}Fe_{81}Nb_{1.2}B_{5.9}$ alloy. Wheel speed increased as mass flow rate increased.

TABLE 4

| Mass flow rate (kg/min) | $Nd_{11.6}Fe_{80.3}Co_{2.4}B_{5.7}$ Wheel Speed (m/s) | $Nd_{11.9}Fe_{81}Nb_{1.2}B_{5.9}$ Wheel Speed (m/s) |
|---|---|---|
| 0.2 | 22.0 | 17.9 |
| 0.5 | 26.0 | 20.5 |
| 0.8 | 32.8 | 24.0 |
| 1.3 | 35.0 | 27.0 |
| 1.9 | 44.0 | 29.0 |

Example 4

Ribbon Dimension Versus Mass Flow Rate

Alloy ribbon dimensions were measured at different mass flow rates for all the alloy ribbons. As shown in FIG. 4*a* and Table 5, the ribbon thickness measured from ribbon surface contacting the rotating wheel surface (wheel side) to the ribbon free surface not contacting the rotating wheel surface (free side) for the $Nd_{11.6}Fe_{80.3}Co_{2.4}B_{5.7}$ alloy was in the range of 28 μm to 32 μm, and the ribbon width measured from ribbon left edge to right edge was in the range of 1 mm to 4 mm.

TABLE 5

| Mass flow rate (kg/min) | Ribbon thickness (μm) | Ribbon width (mm) | Normalized ribbon thickness | Normalized ribbon width |
|---|---|---|---|---|
| 0.2 | 28.1 | 0.90 | 1.00 | 1.00 |
| 0.5 | 31.2 | 1.64 | 1.11 | 1.47 |
| 0.8 | 31.5 | 2.29 | 1.11 | 2.44 |
| 1.3 | 31.6 | 2.79 | 1.15 | 3.15 |
| 1.9 | 31.2 | 3.28 | 1.11 | 3.60 |

Also as shown in FIG. 4*b* and Table 6, the ribbon thickness for the $Nd_{11.9}Fe_{81}Nb_{1.2}B_{5.9}$ alloy was in the range of 35 μm to 47 μm, and the ribbon width was in the range of 1 mm to 4 mm.

TABLE 6

| Mass flow rate (kg/min) | Ribbon thickness (μm) | Ribbon width (mm) | Normalized ribbon thickness | Normalized ribbon width |
|---|---|---|---|---|
| 0.2 | 34.7 | 1.06 | 1.00 | 1.00 |
| 0.5 | 43.0 | 1.70 | 1.24 | 1.61 |
| 0.8 | 44.4 | 2.31 | 1.28 | 2.18 |
| 1.3 | 46.7 | 2.78 | 1.35 | 2.63 |
| 1.9 | 46.3 | 3.79 | 1.34 | 3.58 |

Table 7 further summarizes the various alloy ribbon dimensions at different mass flow rates. It was found that a higher mass flow rate led to a wider ribbon width, but the ribbon thickness did not change significantly.

TABLE 7

| Sample no. | Alloy (at %) | Ribbon thickness @ 1.9 kg/min (μm) | Ribbon width @ 1.9 kg/min (mm) | Ribbon thickness @ 0.2 kg/min (μm) | Ribbon width @ 0.2 kg/min (mm) |
|---|---|---|---|---|---|
| 1 | $Nd_{11.9}Fe_{81}Nb_{1.2}B_{5.9}$ | 46.3 | 3.79 | 34.7 | 1.06 |
| 2 | $Nd_{11.6}Fe_{80.3}Co_{2.4}B_{5.7}$ | 31.2 | 3.28 | 28.1 | 0.90 |
| 3 | $(Nd_{0.75}Pr_{0.25})_{9.9}La_{1.9}Fe_{81.6}Al_1B_{5.6}$ | 31.0 | 4.02 | 28.2 | 1.13 |
| 4 | $(Nd_{0.75}Pr_{0.25})_{10.8}Fe_{81.9}Zr_1B_{6.3}$ | 32.4 | 3.80 | 30.5 | 1.06 |
| 5 | $(Nd_{0.75}Pr_{0.25})_{6.8}Ce_{4.6}Fe_{81.3}Zr_1B_{6.3}$ | 33.0 | 3.42 | 30.9 | 0.95 |
| 6 | $Nd_{12}Fe_{76.3}Co_{5.9}B_{5.8}$ | 32.6 | 3.78 | 29.3 | 1.05 |
| 7 | $Nd_{11.7}Fe_{82.6}B_{5.7}$ | 30.2 | 3.45 | 27.6 | 0.97 |
| 8 | $(Nd_{0.75}Pr_{0.25})_{11.2}Fe_{83.4}B_{5.4}$ | 30.3 | 3.80 | 27.6 | 1.06 |
| 9 | $(Nd_{0.75}Pr_{0.25})_{10.4}Fe_{84.1}B_{5.5}$ | 32.3 | 3.76 | 29.0 | 1.04 |
| 10 | $(Nd_{0.75}Pr_{0.25})_{6.0}La_{3.0}Ce_{3.0}Fe_{81.8}B_{6.2}$ | 32.5 | 3.75 | 29.1 | 1.03 |

The most significant observation from Tables 5 to 7 is that a higher mass flow rate leads to a significantly wider ribbon width (an about 260% increase) when the mass flow rate increased from 0.2 kg/min to 1.9 kg/min; however the ribbon thickness did not change significantly (an only 10-35% increase) when the mass flow rate increased from 0.2 kg/min to 1.9 kg/min. This behaviour has an important impact on the microstructure homogeneity of the rapidly quenched ribbon, which is further discussed in Example 7.

Example 5

Percentage of $RE_2Fe_{14}B$ Crystalline Phase Versus Mass Flow Rate

As discussed above, the alloys disclosed herein have a $RE_2Fe_{14}B$ phase as the main constituent phase. In a melt-spinning process, it is desirable for the alloy to be quenched uniformly so that the entire $RE_2Fe_{14}B$ phase is solidified into very fine and uniform $RE_2Fe_{14}B$ grains. Under this condition, the volume percentage of $RE_2Fe_{14}B$ crystalline phase is also maximized. In other words, a higher percentage of the $RE_2Fe_{14}B$ crystalline phase indicates more uniform quenching in the alloy ribbon.

The percentage volume of $RE_2Fe_{14}B$ crystalline phase was measured at different mass flow rates. It was found that a higher percentage volume of $RE_2Fe_{14}B$ crystalline phase was obtained at a lower mass flow rate. This indicated that there was more uniform quenching at a lower mass flow rate.

As shown in FIG. 5 and Table 8, more than 98 vol % of the as-quenched powders of the $Nd_{11.6}Fe_{80.3}Co_{2.4}B_{5.7}$ alloy were in crystalline $RE_2Fe_{14}B$ phase, with the remaining vol % being amorphous.

TABLE 8

| Mass flow rate (kg/min) | Crystalline $RE_2Fe_{14}B$ phase (vol %) |
|---|---|
| 0.2 | 99.9 |
| 0.5 | 99.6 |
| 0.8 | 98.4 |
| 1.3 | 98.4 |
| 1.9 | 98.3 |

Example 6

Ribbon and Crushed Powder Average Grain Size Versus Mass Flow Rate

X-ray diffraction (XRD) tests were performed on alloy ribbons and crushed powders produced at different mass flow rates. As an example, FIG. 6 shows the typical XRD patterns of $Nd_{11.6}Fe_{80.3}Co_{2.4}B_{5.7}$ alloy powders produced at different mass flow rates. It was found that all peaks can be indexed to $Nd_2Fe_{14}B$ crystal structure, meaning the crystalline phase is the $Nd_2Fe_{14}B$ type phase. Significant peak broadening was also observed, indicating that the $Nd_2Fe_{14}B$ grain size was very small.

The $Nd_2Fe_{14}B$ grain size can be calculated from XRD data using the Scherrer equation:

$$\text{Mean grain size} = K\lambda/\beta \cos\theta$$

where K is a dimensionless shape factor, and has a typical value of about 0.9; λ is the X-ray wavelength and has a value of 1.5405 Å for Cu Kα as the X-ray source; β is the peak full width at half maximum (FWHM) in radians; and ∝ is the Bragg angle.

The grain size of the $RE_2Fe_{14}B$ phase was calculated from XRD data at different mass flow rates using the Scherrer equation as described above. As shown in FIG. 7 and Table 9, the average grain size of crushed powder of the $Nd_{11.6}Fe_{80.3}Co_{2.4}B_{5.7}$ alloy was about 20 nm to 30 nm. It was further found that the lower mass flow rate led to smaller grain size, which in turn led to higher magnetic properties as shown in Examples 1 and 2. However, the grain size difference between the wheel side of the alloy ribbon, and the free side of the alloy ribbon remained about the same at different mass flow rates. This can be understood from the ribbon thickness data shown in Example 4 where it was found that ribbon thickness was essentially kept unchanged as mass flow rate changed. As the grain size difference between ribbon wheel side and free side was mainly caused by cooling rate difference between wheel side and free side and was proportional to the ribbon thickness, nearly unchanged ribbon thickness at various mass flow rate indicates a similar grain size difference between the ribbon wheel side and free side.

TABLE 9

| Mass flow rate (kg/min) | Wheel side grain size (nm) | Free side grain size (nm) | Powder grain size (nm) |
|---|---|---|---|
| 0.2 | 19.4 | 24.5 | 21.8 |
| 0.5 | 20.9 | 24.4 | 23.3 |
| 0.8 | 22.5 | 27.4 | 23.7 |
| 1.3 | 23.3 | 27.8 | 25.1 |
| 1.9 | 23.4 | 29.4 | 26.2 |

Example 7

Grain Size Uniformity Across Ribbon Width Direction

As discussed above, a uniform grain size across ribbon width direction (from ribbon left edge to central portion then to right edge) is critical for achieving high-performance alloy ribbons. In this example, ribbon cross section areas were observed under a field-emission scanning electronic microscope (SEM) from the ribbon left edge to center portion to right edge. The average grain size of the $RE_2Fe_{14}B$ phase at each area was calculated using ImageJ software (Image Processing and Analysis in Java, http://rsb.info.nih.gov.ij, version 1.51j8) The results are summarized in FIGS. 8, 9 and Table 10. It was found that lower mass flow rates produced more uniform grain sizes when measured across the width of the alloy ribbon.

FIG. 10 is an exemplary depiction of the sections that make up the width of an alloy ribbon of the present invention. As shown in FIG. 10, the left-edge of the alloy ribbon comprises the first 5% of the width (i.e. 0% to 5%), the center-left portion comprises the next 30% of the width (i.e. 5% to 35%), the center portion comprises the next 30% of the width (i.e. 35% to 65%), the center-right portion comprises the next 30% of the width (i.e. 65% to 95%), and the right-edge portion of the alloy ribbon comprises the last 5% of the width (i.e. 95% to 100%).

As shown in FIGS. 8, 9 and Table 10, lower mass flow rate at 0.2 to 0.8 kg/min produced more uniform grain sizes from left to right edge for the $Nd_{11.6}Fe_{80.3}Co_{2.4}B_{5.7}$ alloy ribbon, with grain size ranging from 21 to 27 nm and the grain size difference between center portion and left/right edges being only 2 to 4% for 0.2 kg/min mass flow rate, 8 to 12% for 0.5 kg/min mass flow rate and 17 to19% for 0.8 kg/min mass flow rate, respectively.

At higher mass flow rate of 1.3 kg/min and 1.9 kg/min, however, it was seen that both edges had much smaller grains when compared to the center portion, with the grain size ranging from 15 to 29 nm and the grain size difference between the center portion and the left and right edges being 27 to 31% for 1.3 kg/min mass flow rate and 36 to 48% for 1.9 kg/min mass flow rate.

It is therefore evident that lower mass flow rate produces much more uniform grain sizes when measured across the width of the alloy ribbon. This indicates that the cooling rate across the ribbon width is more uniform at lower mass flow rate, and it becomes less uniform as mass flow rate increases. Specifically, at high mass flow rate, the edge areas were over-quenched (i.e. cooling rate is too fast) leading to too small grains or even a partially amorphous phase (meaning no grains at all), and the central portion is under-quenched (i.e. cooling rate is too slow) leading to very large grains. This is also in good agreement with the fact that ribbon width increases significantly with mass flow rate as shown in Example 4. From the point of view of heat transfer between the alloy ribbon and the quenching wheel, a narrow ribbon produced at lower mass flow rate would have a more uniform temperature across the ribbon width and therefore a uniform cooling rate. However, for a wider ribbon, its edge area will have lower temperature than the center portion as it is further away from the source of the heat (i.e. the alloy stream). This will cause a non-uniform cooling rate with the edges being cooled down much faster than the center portion.

TABLE 10

| Mass flow rate (kg/min) | Left-edge ribbon grain size (nm) | Left-center ribbon grain size (nm) | Center-portion ribbon grain size (nm) | Center-right ribbon grain size (nm) | Right-edge ribbon grain size (nm) | Grain size difference between center and edges (%) |
|---|---|---|---|---|---|---|
| 0.2 | 24.3 | 23.6 | 25.4 | 24.1 | 24.8 | 2 to 4 |
| 0.5 | 22.5 | 26.7 | 25.5 | 25.4 | 23.4 | 8 to 12 |
| 0.8 | 21.5 | 22.7 | 26.5 | 25.1 | 21.9 | 17 to 19 |

TABLE 10-continued

| Mass flow rate (kg/min) | Left-edge ribbon grain size (nm) | Left-center ribbon grain size (nm) | Center-portion ribbon grain size (nm) | Center-right ribbon grain size (nm) | Right-edge ribbon grain size (nm) | Grain size difference between center and edges (%) |
|---|---|---|---|---|---|---|
| 1.3 | 19.1 | 24.8 | 27.6 | 25.7 | 20.2 | 27 to 31 |
| 1.9 | 15.0 | 26.6 | 29.0 | 26.9 | 18.6 | 36 to 48 |

INDUSTRIAL APPLICABILITY

The disclosed alloy compositions, magnetic materials, bonded magnets may advantageously exhibit improved magnetic properties, for example, high $B_r$, $(BH)_{max}$ and $H_{ci}$ values.

Advantageously, the methods for making the disclosed alloys of the present disclosure may produce alloys with a substantially uniform ribbon microstructure.

More advantageously, the method of the present disclosure may produce alloys with primarily $RE_2Fe_{14}B$ phase.

Further advantageously, the method of the present disclosure may result in substantially uniform quenching.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. An alloy with composition of Formula (I):

RE-Fe-M-B  Formula (I)

wherein:

RE is one or more rare earth metals selected from the group consisting of lanthanum (La), cerium (Ce), neodymium (Nd), praseodymium (Pr), yttrium (Y), gadolinium (Gd), terbium (Tb), dysoprium (Dy), holmium (Ho), and ytterbium (Yb);

Fe is iron;

M is absent or one or more metals selected from the group consisting of zirconium (Zr), niobium (Nb), molybdenum (Mo), titanium (Ti), vanadium (V), chromium (Cr), manganese (Mn), hafnium (Hf), tantalum (Ta), tungsten (W), cobalt (Co), copper (Cu), gallium (Ga) and aluminum (Al); and B is boron;

wherein:

said alloy comprises at least 98 vol % crystalline $RE_2Fe_{14}B$ phase;

the average crystal grain size of the $RE_2Fe_{14}B$ phase is in the range of 20 nm to 40 nm; and the alloy is an alloy ribbon having a width measured from a left edge to a center portion to a right edge, the center portion comprising from about 0.5% to about 20% of the width on either side of a center line of the alloy ribbon, the left and right edges each comprising up to 10% of the width of the alloy ribbon from their respective edges, and the average crystal $RE_2Fe_{14}B$ grain size difference between the center portion, and left and right edges of said alloy ribbon is less than 20%.

2. The alloy of claim 1, comprising less than 10 atom % boron.

3. The alloy of claim 1, wherein the average crystal grain size of the $RE_2Fe_{14}B$ phase at the center portion of said alloy ribbon is in the range of 25 nm to 40 nm, and the average crystal grain size of the $RE_2Fe_{14}B$ phass at the left and right edges of said alloy ribbon is 20 nm to 30 nm.

4. The alloy of claim 1, wherein RE is selected from the group consisting of:

(i) Nd;
(ii) Nd, Pr;
(iii) Nd, Pr, La;
(iv) Nd, Pr, Ce;
(v) Nd, Pr, La, Ce;
(vi) Nd, La;
(vii) Nd, Ce;
(viii) Nd, Ce, La;
(ix) Pr;
(x) Pr, La;
(xi) Pr, Ce; and
(xii) Pr, La, Ce.

5. The alloy of claim 1, wherein Formula (I) is selected from the group consisting of:

1 Nd-Fe-Nb-B;
(ii) Nd-Fe-Co-B;
(iii) (NdPrLa)-Fe-Al-B;
(iv) (NdPr)-Fe-Zr-B;
(v) (NdPrCe)-Fe-Zr-B;
(vi) Nd-Fe-Co-B;
(vii) Nd-Fe-B;
(viii) (NdPr)-Fe-B;
(ix) (NdPrLaCe)-Fe-B;
(x) (NdPr)-Fe-Co-B; and
(xi) (NdPr)-Fe-Nb-B.

6. The alloy of claim 1, wherein Formula (I) is of Formula (Ia):

$$RE_x\text{-}Fe_{(100\text{-}x\text{-}y\text{-}z)}\text{-}My\text{-}Bz \quad \text{Formula (Ia)}$$

wherein:

RE is one or more rare earth metals selected from the group consisting of lanthanum (La), cerium (Ce), neodymium (Nd), praseodymium (Pr), yttrium (Y), gadolinium (Gd), terbium (Tb), dysoprium (Dy), holmium (Ho), and ytterbium (Yb);

Fe is iron;

M is absent or one or more metals selected from the group consisting of zirconium (Zr), niobium (Nb), molybdenum (Mo), titanium (Ti), vanadium (V), chromium (Cr), manganese (Mn), hafnium (Hf), tantalum (Ta), tungsten (W), cobalt (Co), copper (Cu), gallium (Ga) and aluminum (Al);

B is boron; and x, y, z are atom % in which $8.0 \le x \le 14.0$, $0 \le y \le 2.0$ and $5.0 \le z \le 7.0$.

7. A magnetic material comprising a powder of the alloy of claim 1.

8. The alloy of claim 1, wherein the alloy of Formula (I) is selected from the group consisting of:

(i) $Nd_{11.9}Fe_{81.0}Nb_{1.2}B_{5.9}$;
(ii) $Nd_{11.6}Fe_{80.3}C_{02.4}B_{5.7}$;
(iii) $(Nd_{0.75}Pr_{0.25})_{9.9}La_{1.9}Fe_{81.6}Al_{1.0}B_{5.6}$;
(iv) $(Nd_{0.75}Pr_{0.25})_{10.8}Fe_{81.9}Zr_{1.0}B_{6.3}$;
(v) $(Nd_{0.75}Pr_{0.25})_{6.8}Ce_{4.6}Fe_{81.3}Zr_{1.0}B_{6.3}$;
(vi) $Nd_{12.0}Fe_{76.3}C_{05.9}B_{5.8}$;
(vii) $Nd_{11.7}Fe_{82.6}B_{5.7}$;
(viii) $(Nd_{0.75}Pr_{0.25})_{11.2}Fe_{83.4}B_{5.4}$;
(ix) $(Nd_{0.75}Pr_{0.25})_{10.4}Fe_{84.1}B_{5.5}$;
(x) $(Nd_{0.75}Pr_{0.25})_{6.0}La_{3.0}Ce_{3.0}Fe_{81.8}B_{6.2}$.

9. A method for preparing an alloy ribbon with composition comprising Formula (I):

$$RE\text{-}Fe\text{-}M\text{-}B \quad \text{Formula (I)}$$

wherein:

RE is one or more rare earth metals selected from the group consisting of lanthanum (La), cerium (Ce), neodymium (Nd), praseodymium (Pr), yttrium (Y), gadolinium (Gd), terbium (Tb), dysoprium (Dy), holmium (Ho), and ytterbium (Yb);

Fe is iron;

M is absent or one or more metals selected from the group consisting of zirconium (Zr), niobium (Nb), molybdenum (Mo), titanium (Ti), vanadium (V), chromium (Cr), manganese (Mn), hafnium (Hf), tantalum (Ta), tungsten (W), cobalt (Co), copper (Cu), gallium (Ga) and aluminum (Al); and B is boron, wherein:

the alloy comprises at least 98 vol % crystalline $RE_2Fe_{14}B$ phase;

the average crystal grain size of the $RE_2Fe_{14}B$ phase is in the range of 20 nm to 40 nm;

the alloy is an alloy ribbon having a width measured from a left edge to a center portion to a right edge, the center portion comprising from about 0.5% to about 20% of the width on either side of a center line of the alloy ribbon, the left and right edges each comprising up to 10% of the width of the alloy ribbon from their respective edges, and the average crystal $RE_2Fe_{14}B$ grain size difference between the center portion, and left and right edges of said alloy ribbon is less than 20%;

comprising the steps of:

(i) ejecting a melt of an alloy with composition of Formula (I) onto a rotating wheel at a mass flow rate in the range of 0.2 kg/min to 1.0 kg/min, wherein the ejection temperature is in the range of 1400° C. to 1600° C., and wherein the wheel is rotating at a speed in the range of 20 m/s to 45 m/s; and (ii) quenching the melt using the rotating wheel to obtain said alloy ribbon.

10. The method of claim 9, wherein the wheel is rotating at a speed in the range of 25 m/s to 45 m/s, or wherein the melt is ejected onto the rotating wheel through one or more nozzles, and wherein the mass flow rate is controlled by controlling the diameter of said nozzle(s).

11. The method of claim 9, wherein step (ii) comprises a melt spinning process.

12. The method of claim 9, wherein the alloy ribbon has a thickness in the range of 20 μm to 50 μm, or wherein the alloy ribbon has a width in the range of 1 mm to 5 mm.

13. The method of claim 12, wherein the average crystal $RE_2Fe_{14}B$ grain size at the center portion of the alloy ribbon is in the range of 25 nm to 40 nm, and the average $RE_2Fe_{14}B$ grain size at the left and right edges of the alloy ribbon is 20 nm to 30 nm.

14. The alloy of claim 9, wherein RE is selected from the group consisting of:

(i) Nd;
(ii) Nd, Pr;
(iii) Nd, Pr, La;

(iv) Nd, Pr, Ce;

(v) Nd, Pr, La, Ce;

(vi) Nd, La;

(vii) Nd, Ce;

(viii) Nd, Ce, La;

(ix) Pr;

(x) Pr, La;

(xi) Pr, Ce; and (xii) Pr, La, Ce.

15. The method of claim 9, wherein Formula (I) is selected from the group consisting of:

(i) Nd-Fe-Nb-B;

(ii) Nd-Fe-Co-B;

(iii) (NdPrLa)-Fe-Al-B;

(iv) (NdPr)-Fe-Zr-B;

(v) (NdPrCe)-Fe-Zr-B;

(vi) Nd-Fe-Co-B;

(vii) Nd-Fe-B;

(viii) (NdPr)-Fe-B;

(ix) (NdPrLaCe)-Fe-B;

(x) (NdPr)-Fe-Co-B; and (xi) (NdPr)-Fe-Nb-B.

16. The method of claim 9, wherein the rapidly solidified alloy comprises less than 10 at % boron.

17. The method of claim 9, wherein Formula (I) is of Formula (Ia):

$$RE_x\text{-}Fe_{(100\text{-}x\text{-}y\text{-}z)}\text{-}My\text{-}Bz \qquad \text{Formula (Ia)}$$

wherein:

RE is one or more rare earth metals selected from the group consisting of lanthanum (La), cerium (Ce), neodymium (Nd), praseodymium (Pr), yttrium (Y), gadolinium (Gd), terbium (Tb), dysoprium (Dy), holmium (Ho), and ytterbium (Yb);

Fe is iron;

M is absent or one or more metals selected from the group consisting of zirconium (Zr), niobium (Nb), molybdenum (Mo), titanium (Ti), vanadium (V), chromium (Cr), manganese (Mn), hafnium (Hf), tantalum (Ta), tungsten (W), cobalt (Co), copper (Cu), gallium (Ga) and aluminum (Al);

B is boron; and x, y, z are atom % in which $8.0 \leq x \leq 14.0$, $0 \leq y \leq 2.0$ and $5.0 \leq z \leq 7.0$.

18. The method of claim 9, wherein the alloy of Formula (I) is selected from the group consisting of:

(i) $Nd_{11.9}Fe_{81.0}Nb_{1.2}B_{5.9}$;

(ii) $Nd_{11.6}Fes_{0.3}C_{02.4}B_{5.7}$;

(iii) $(Nd_{0.75}Pr_{0.25})_{9.9}La_{1.9}Fe_{81.6}Al_{1.0}B_{5.6}$;

(iv) $(Nd_{0.75}Pr_{0.25})_{10.8}Fe_{81.9}Zr_{1.0}B_{6.3}$;

(v) $(Nd_{0.75}Pr_{0.25})_{6.8}Ce_{4.6}Fe_{81.3}Zr_{1.0}B_{6.3}$;

(vi) $Nd_{12.0}Fe_{76.3}C_{05.9}B_{5.8}$;

(vii) $Nd_{11.7}Fe_{82.6}B_{5.7}$;

(viii) $(Nd_{0.75}Pr_{0.25})_{11.2}Fe_{83.4}B_{5.4}$;

(ix) $(Nd_{0.75}Pr_{0.25})_{10.4}Fe_{84.1}B_{5.5}$; and (x) $(Nd_{0.75}Pr_{0.25})_{6.0}La_{3.0}Ce_{3.0}Fe_{81.8}B_{6.2}$.

19. The method of claim 9, wherein the nozzle diameter is in the range of 0.5 mm to 1.4 mm.

* * * * *